(12) United States Patent
Yoshida et al.

(10) Patent No.: US 11,964,794 B2
(45) Date of Patent: Apr. 23, 2024

(54) CONTAINER AND STRUCTURE

(71) Applicant: KYORAKU CO., LTD., Kyoto (JP)

(72) Inventors: Kouichiro Yoshida, Tokyo (JP); Naohiro Ikeguchi, Tokyo (JP)

(73) Assignee: Kyoraku Co., Ltd., Kyoto (JP)

( * ) Notice: Subject to any disclaimer, the term of this patent is extended or adjusted under 35 U.S.C. 154(b) by 77 days.

(21) Appl. No.: 17/417,200

(22) PCT Filed: Dec. 23, 2019

(86) PCT No.: PCT/JP2019/050322
§ 371 (c)(1),
(2) Date: Jun. 22, 2021

(87) PCT Pub. No.: WO2020/137957
PCT Pub. Date: Jul. 2, 2020

(65) Prior Publication Data
US 2022/0055795 A1    Feb. 24, 2022

(30) Foreign Application Priority Data

Dec. 28, 2018 (JP) .................... 2018-246986
Dec. 28, 2018 (JP) .................... 2018-247002

(51) Int. Cl.
*B65D 6/24* (2006.01)
*B29C 43/14* (2006.01)
(Continued)

(52) U.S. Cl.
CPC ........ *B65D 11/1893* (2013.01); *B29C 43/146* (2013.01); *B29C 43/16* (2013.01);
(Continued)

(58) Field of Classification Search
CPC .... B65D 11/1893; B65D 11/20; B65D 43/22; B65D 7/30; B65D 2519/009
(Continued)

(56) References Cited

U.S. PATENT DOCUMENTS 2,663,392 A * 12/1953 Miller ................ E03C 1/18
220/826
9,926,112 B2 * 3/2018 Greenberg ............. B65D 43/06
(Continued)

FOREIGN PATENT DOCUMENTS

CN        1728732 A        2/2006
DE     295 09 912 U1      8/1995
(Continued)

OTHER PUBLICATIONS

Office Action dated Sep. 13, 2022 in corresponding Japanese Patent Application No. 2018247002; 7 pages.
(Continued)

*Primary Examiner* — Jeffrey R Allen
(74) *Attorney, Agent, or Firm* — Maier & Maier, PLLC

(57) ABSTRACT

A container capable of suppressing the unexpected opening of a pair of upper walls including a first side wall and a second side wall facing each other; a third side wall provided therebetween; a first upper wall and a second upper wall; and a locking member. The first side wall and the second side wall face each other. The first upper wall and the second upper wall are configured to be rotatable with respect to the first side wall and the second side wall, respectively. The locking member includes a fixed portion and an engagement portion, the fixed portion being fixed to the third side wall, the engagement portion being engaged with at least one of the first upper wall and the second upper wall to prevent the first upper wall and the second upper wall from opening.

6 Claims, 28 Drawing Sheets

(51) Int. Cl.
    *B29C 43/16*     (2006.01)
    *B29C 51/12*     (2006.01)
    *B29L 9/00*     (2006.01)
    *B29L 31/00*     (2006.01)
    *B65D 6/00*     (2006.01)
    *B65D 43/22*     (2006.01)

(52) U.S. Cl.
    CPC .............. *B29C 51/12* (2013.01); *B65D 11/20* (2013.01); *B65D 43/22* (2013.01); *B29L 2009/00* (2013.01); *B29L 2031/7162* (2013.01)

(58) Field of Classification Search
    USPC .................. 220/826, 324, 323, 315; 206/483
    See application file for complete search history.

(56) References Cited

U.S. PATENT DOCUMENTS

| | | | |
|---|---|---|---|
| 2003/0010783 A1* | 1/2003 | Prezelin ................ | B65D 45/20 220/361 |
| 2004/0026296 A1 | 2/2004 | Nesting | |
| 2006/0021889 A1 | 2/2006 | Kim | |
| 2010/0127060 A1* | 5/2010 | Hayashi ................ | B65D 11/20 229/126 |
| 2012/0024855 A1 | 2/2012 | Smyers | |
| 2019/0202142 A1 | 7/2019 | Uehara | |
| 2019/0248061 A1 | 8/2019 | Funato et al. | |

FOREIGN PATENT DOCUMENTS

| | | |
|---|---|---|
| JP | S6144804 U | 3/1986 |
| JP | H03-15360 U | 2/1991 |
| JP | H07-17535 A | 1/1995 |
| JP | H0768581 A | 3/1995 |
| JP | 3016828 U | 10/1995 |
| JP | H0872082 A | 3/1996 |
| JP | 3036173 U | 4/1997 |
| JP | H09-240669 A | 9/1997 |
| JP | 2000335570 A | 12/2000 |
| JP | 2001-180670 A | 7/2001 |
| JP | 2002-332047 A | 11/2002 |
| JP | 2016221884 A | 12/2016 |
| KR | 100659222 B1 | 12/2006 |
| WO | 2018043390 A1 | 3/2018 |
| WO | 2018051445 A1 | 3/2018 |

OTHER PUBLICATIONS

Office Action dated Nov. 14, 2022 in corresponding Chinese Patent Application No. 201980071957.6; 15 pages.
International Search Report dated Mar. 17, 2020 in corresponding International application No. PCT/JP2019/050322; 5 pages.
Office Action dated Jan. 31, 2023, in corresponding Japanese Application No. 2018-247002, 6 pages.

* cited by examiner

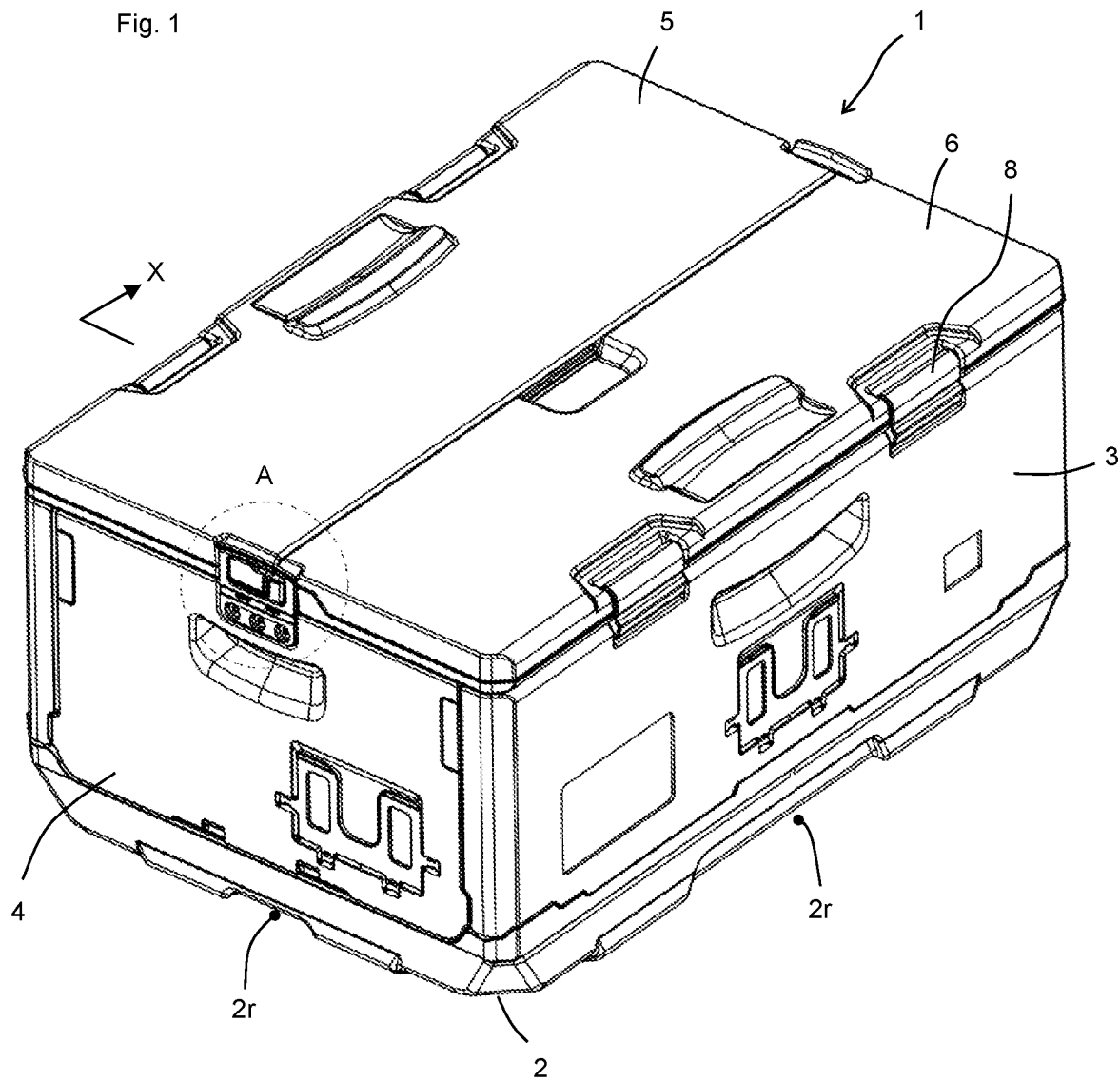
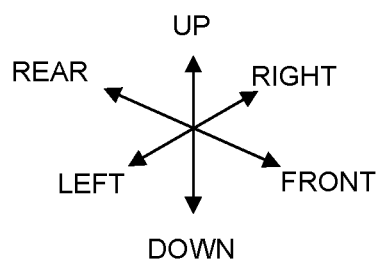

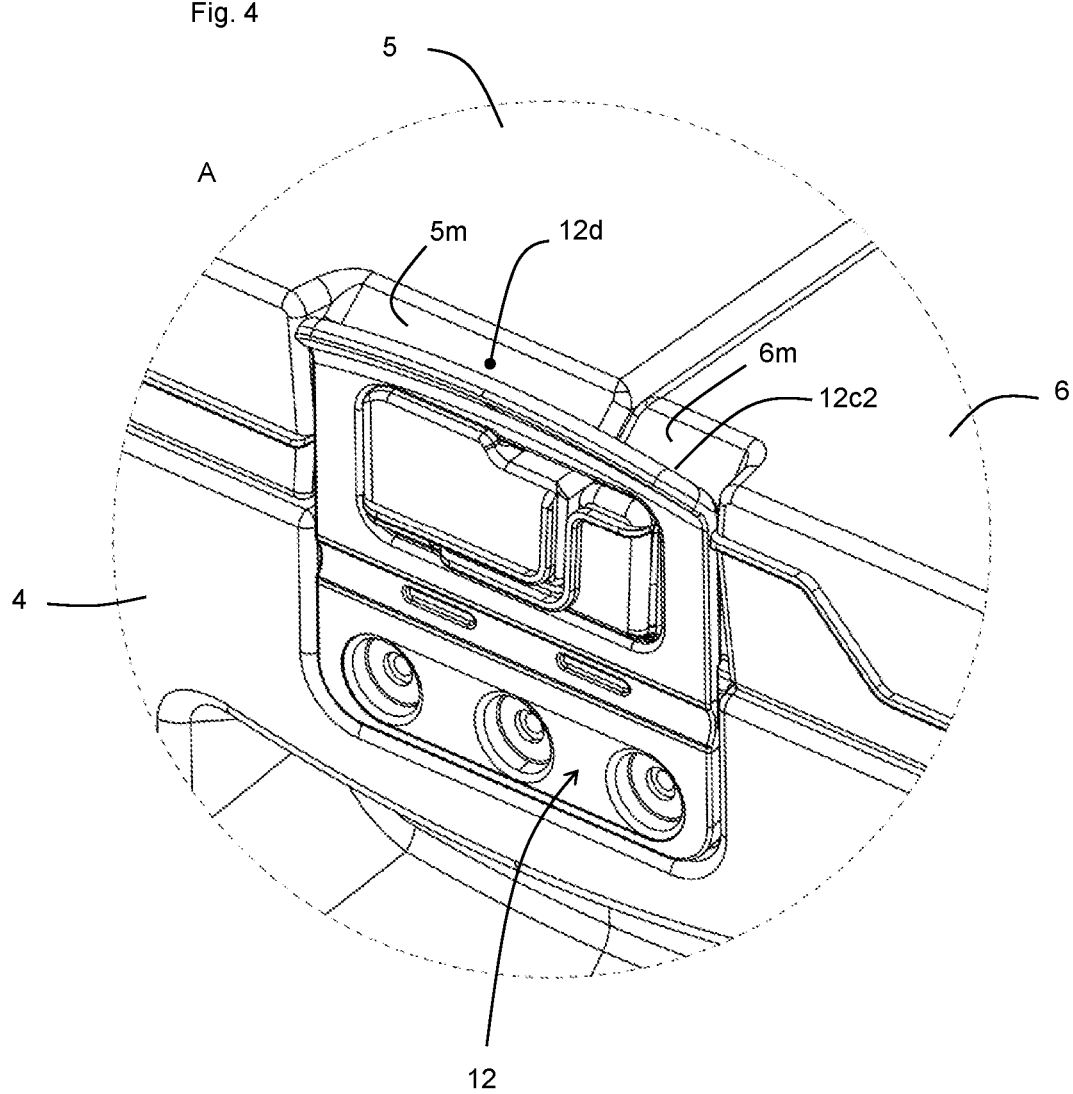

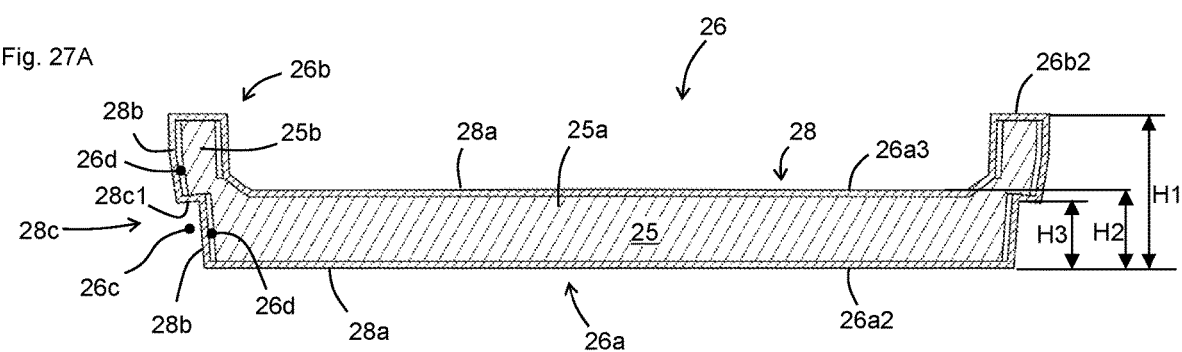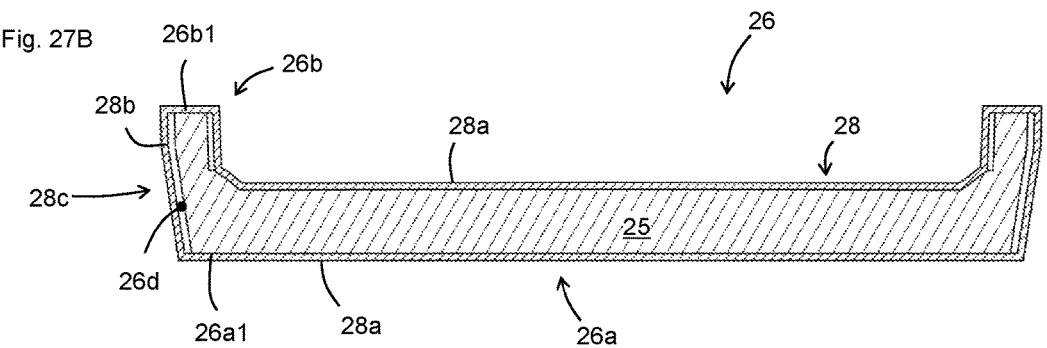

CONTAINER AND STRUCTURE

TECHNICAL FIELD

The present invention relates to a container, such as an assembly container, and a structure that can be used as a component of the container.

BACKGROUND

First Viewpoint

Patent Literature 1 discloses an assembly container including resin panels.

Second Viewpoint

The container body of the multi-layer heat insulated container disclosed in Patent Literature 2 is configured by sandwiching a core layer, which is a foam resin molded product, between an inner exterior material and an outer exterior material.

Patent Literature

Patent Literature 1: JP-A-2001-180670
Patent Literature 2: JP-A-2002-332047

SUMMARY

First Viewpoint

In Patent Literature 1, an upper wall of the container includes a pair of lids. In this configuration, there is a risk that the pair of lids may open unexpectedly.

The present invention has been made in view of such circumstances and provides a container capable of suppressing the unexpected opening of a pair of upper walls.

Second Viewpoint

In the configuration of Patent Literature 2, there is a gap between the core layer and the outer exterior material. Due to this gap, wrinkles and ripples may occur on the outer exterior material when the outer exterior material is cooled after heating during molding. This problem is more likely to occur in a structure provided with a standing wall, such as a peripheral wall of a container body of Patent Literature 2.

The present invention has been made in view of such circumstances and provides a structure, which is configured by accommodating a core material inside a resin molded body, capable of suppressing wrinkles on a side surface of a resin molded body even when a standing wall is provided.

SOLUTION TO PROBLEM

First Viewpoint

According to the present invention, provided is a container, comprising: a first side wall and a second side wall facing each other; a third side wall provided therebetween; a first upper wall and a second upper wall; and a locking member, wherein the first side wall and the second side wall face each other, the first upper wall and the second upper wall are configured to be rotatable with respect to the first side wall and the second side wall, respectively, and the locking member comprises a fixed portion and an engagement portion, the fixed portion being fixed to the third side wall, the engagement portion being engaged with at least one of the first upper wall and the second upper wall to prevent the first upper wall and the second upper wall from opening.

In the container of the present invention, the opening of the first upper wall and the second upper wall is suppressed by engaging the engagement portion of the locking member with at least one of the first upper wall and the second upper wall. Consequently, the present invention can suppress the unexpected opening of the pair of upper walls.

Hereinafter, various embodiments of the present invention will be exemplified. The embodiments described below can be combined with each other.

Preferably, the first upper wall and the second upper wall each comprise a convex portion protruding toward the locking member, the engagement portion comprises an opening, and the engagement portion is engaged with the first upper wall and the second upper wall by inserting the convex portion of the first upper wall and the second upper wall into the opening, to prevent the first upper wall and the second upper wall from opening.

Preferably, the first upper wall and the second upper wall comprise an overlapping portion overlapping each other, the first upper wall is arranged above the second upper wall in the overlapping portion, the first upper wall comprises a convex portion protruding toward the locking member, the engagement portion comprises an opening, and the engagement portion is engaged with the first upper wall by inserting the convex portion of the first upper wall into the opening, to prevent the first upper wall and the second upper wall from opening.

Preferably, an inclined portion inclined away from the first upper wall and the second upper wall is provided at an upper end of the engagement portion.

Preferably, the locking member comprises a hinge portion, and the engagement portion is bendable at the hinge portion with respect to the fixed portion.

Preferably, the hinge portion is made of elastomer.

Preferably, the locking member comprises a connecting portion configured to connect the fixed portion and the engagement portion, and the hinge portion is formed to cover the connecting portion with the elastomer.

Second Viewpoint

According to the present invention, provided is a structure, comprising: a base portion; and a standing portion standing from an end of the base portion, wherein the structure is configured by accommodating a core material inside a resin molded body, and the structure comprises, at the end of the base portion, a concave portion recessed toward the standing portion.

The structure of the present invention is provided with a concave portion recessed toward the standing portion, at the end of the base portion. The bottom wall facing the standing portion is formed on the resin molded body as a result of forming this concave portion, and this bottom wall is welded to the core material, so that the occurrence of wrinkles on the resin molded body can be suppressed.

Hereinafter, various embodiments of the present invention will be exemplified. The embodiments described below can be combined with each other.

Preferably, the resin molded body comprises a side wall, the side wall being a side surface of the structure at a site provided with the standing portion, a bottom wall facing the standing portion is formed on the side wall by the concave portion, and the bottom wall is welded to the core material.

Preferably, welding strength between the bottom wall and the core material is higher than welding strength between a portion of the side wall other than the bottom wall and the core material.

Preferably, the concave portion is provided at a center of the base portion along a longitudinal direction thereof.

According to another viewpoint of the present invention, provided is a manufacturing method of the structure, comprising: a step of forming the structure by closing a first mold and a second mold in a state where a first resin sheet, the core material, and a second resin sheet are arranged in this order between the first mold and the second mold.

Preferably, in the method, the resin molded body is configured to include a base wall and a standing wall, the base wall having an angle of less than 45 degrees with respect to a mold closing direction of the first mold and the second mold, the standing wall having an angle of 45 degrees or less, and welding strength between the standing wall and the core material is lower than welding strength between the base wall and the core material.

BRIEF DESCRIPTION OF DRAWINGS

FIG. 1 is a perspective view of a container 1 of an embodiment of the present invention.

FIG. 4 is an enlarged view of a region A in FIG. 1.

FIG. 27A is a cross-sectional view showing a structure 26 including a concave portion 26c.

FIG. 27B is a cross-sectional view showing the structure 26 without the concave portion 26c.

DETAILED DESCRIPTION

Figure 2:
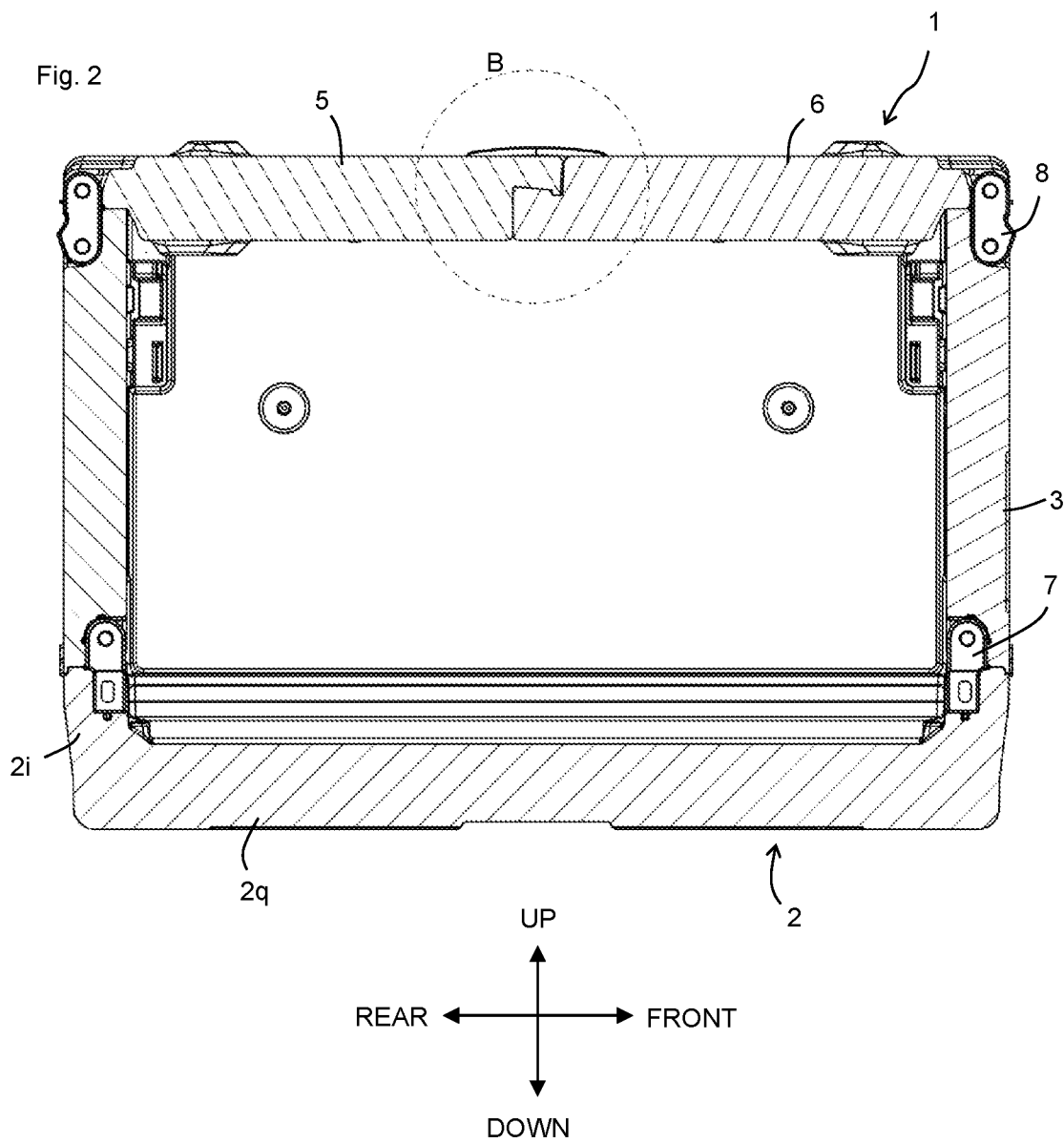
FIG. 2 is a cross-sectional view taken at the portion indicated by an arrow X in FIG. 1 (an upper hinge member 8 and a lower hinge member 7 are shown in a left side view).

Hereinafter, embodiments of the present invention will be described. Various characteristics described in the embodiments below can be combined with each other. Further, the invention is independently established for each characteristic.

1. Overall Configuration

As shown in FIG. 1, a container 1 of the present embodiment is an assembly cold insulation container. The container 1 includes a bottom member 2, a pair of long side walls 3 facing each other, a pair of short side walls 4 facing each other, and a first upper wall 5 and a second upper wall 6. Although it is preferable, from the viewpoints of strength, heat insulation, lightness and the like, that these members have a sandwich structure in which a foamed body is sandwiched between resin sheets, they may have another configuration, such as a hollow double-walled structure or a structure including only the foamed body.

The container 1 has a substantially rectangular parallelepiped shape. The bottom member 2 and the upper walls 5, 6 are configured to face each other. The pair of short side walls 4 are arranged between the pair of long side walls 3. The pair of long side walls 3 and the pair of short side walls 4 form a side wall of the container 1. The upper walls 5, 6 form a lid of the container 1. These members are connected to each other such that no gap is formed between the members to enhance the sealability of the container 1.

In the following description, up, down, left, right, front, and rear are defined as illustrated in FIG. 1 and FIG. 2. That is, in a direction perpendicular to the main surface of the upper wall 5, a side of the upper wall 5 is defined as "up", and a side of the bottom member 2 is defined as "down". In the direction perpendicular to the main surface of the long side wall 3, a near side is defined as "front", and a far side is defined as "rear". In the direction perpendicular to the main surface of the short side wall 4, a left side of FIG. 1 is defined as "left", and a right side is defined as "right". Going in the "up" and "down" directions are also expressed as "becoming higher" and "becoming lower", respectively. A configuration to "face each other" preferably refers to a configuration to face in parallel. The "horizontal plane" is a plane including a straight line extending in the left-right direction and a straight line extending in the front-rear direction.

As shown in FIG. 2, the long side wall 3 is rotatably connected to the bottom member 2 via a lower hinge member 7. The short side wall 4 is directly and rotatably connected to the bottom member 2. The upper walls 5, 6 are each rotatably connected to the long side wall 3 via an upper hinge member 8. The long side wall 3 and the short side wall 4 are connected to each other at a connecting mechanism 9 (shown in FIG. 22). The bottom member 2 includes a bottom wall 2q and a peripheral wall 2i standing from the circumference of the bottom wall 2q. The peripheral wall 2i is provided both at a site facing the long side walls 3 and at a site facing the short side walls 4, and that is, it is provided on the entire circumference of the bottom wall 2q.

2. Configuration of Upper Walls 5, 6

Figure 3A:
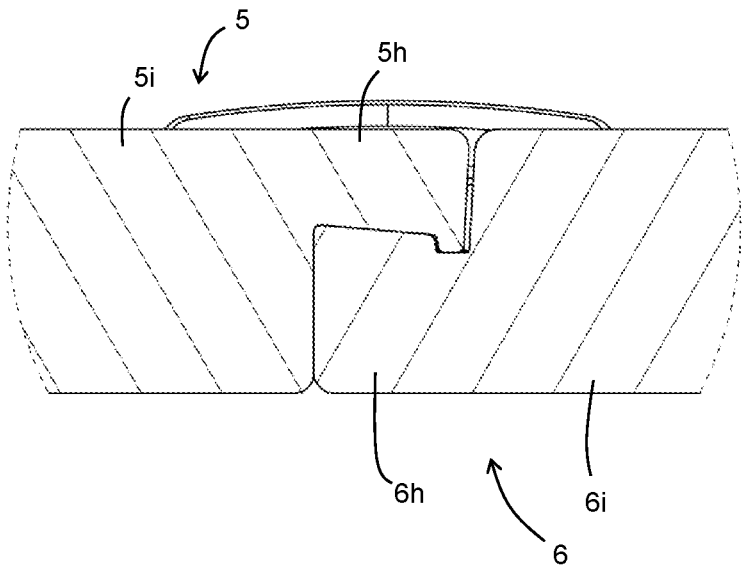
FIG. 3A is an enlarged view of a region B in FIG. 2.
Figure 3B:
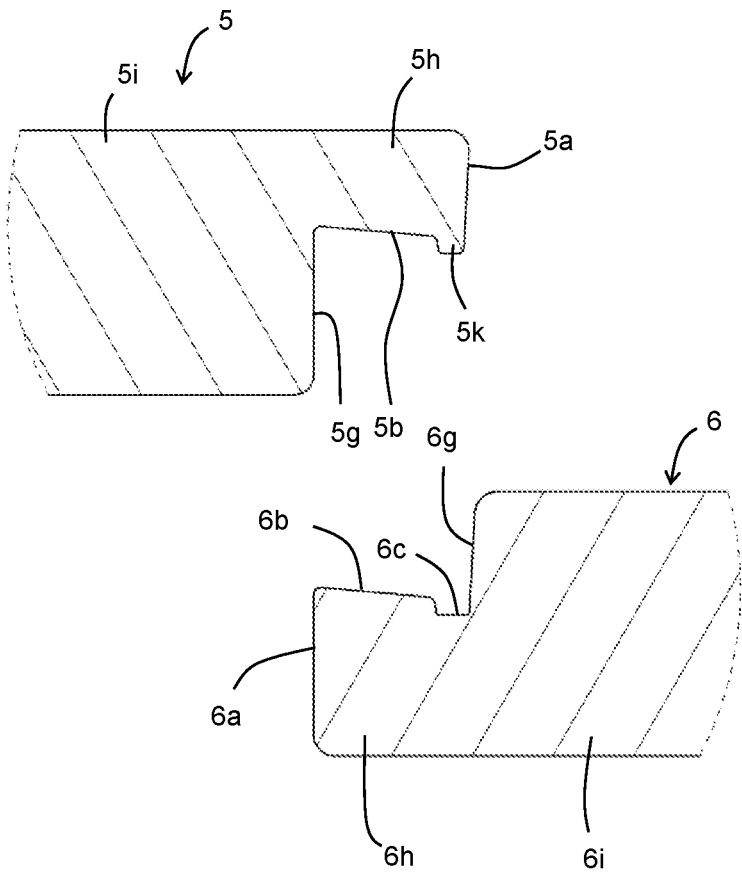
FIG. 3B is a cross-sectional view showing upper walls 5, 6 in FIG. 3A separated from each other.

As shown in FIG. 2 to FIG. 3B, the upper walls 5, 6 include overlapping portions 5h, 6h overlapping each other. The total thickness of the upper walls 5, 6 at the overlapping portions 5h, 6h is equal to the thickness of the upper walls 5, 6 at adjacent portions 5i, 6i adjacent to the overlapping portions 5h, 6h. The upper wall 5 includes an inclined surface 5b becoming lower toward a distal end of the overlapping portion 5h. The upper wall 6 includes an inclined surface 6b becoming higher toward a distal end of the overlapping portion 6h.

When the upper walls 5, 6 are closed, a tip surface 5a of the overlapping portion 5h faces a tip surface 6g of the adjacent portion 6i, and a tip surface 6a of the overlapping portion 6h faces a tip surface 5g of the adjacent portion 5i. The tip surfaces 5a, 6g are formed as a tapered surface inclined so as not to interfere when closing the upper walls 5, 6. A ridge 5k is provided at a distal end of the inclined surface 5b, and a groove 6c is provided at a proximal end of the inclined surface 6b. The engagement of the ridge 5k and the groove 6c makes it difficult to form a gap between the upper walls 5, 6.

Figure 5:
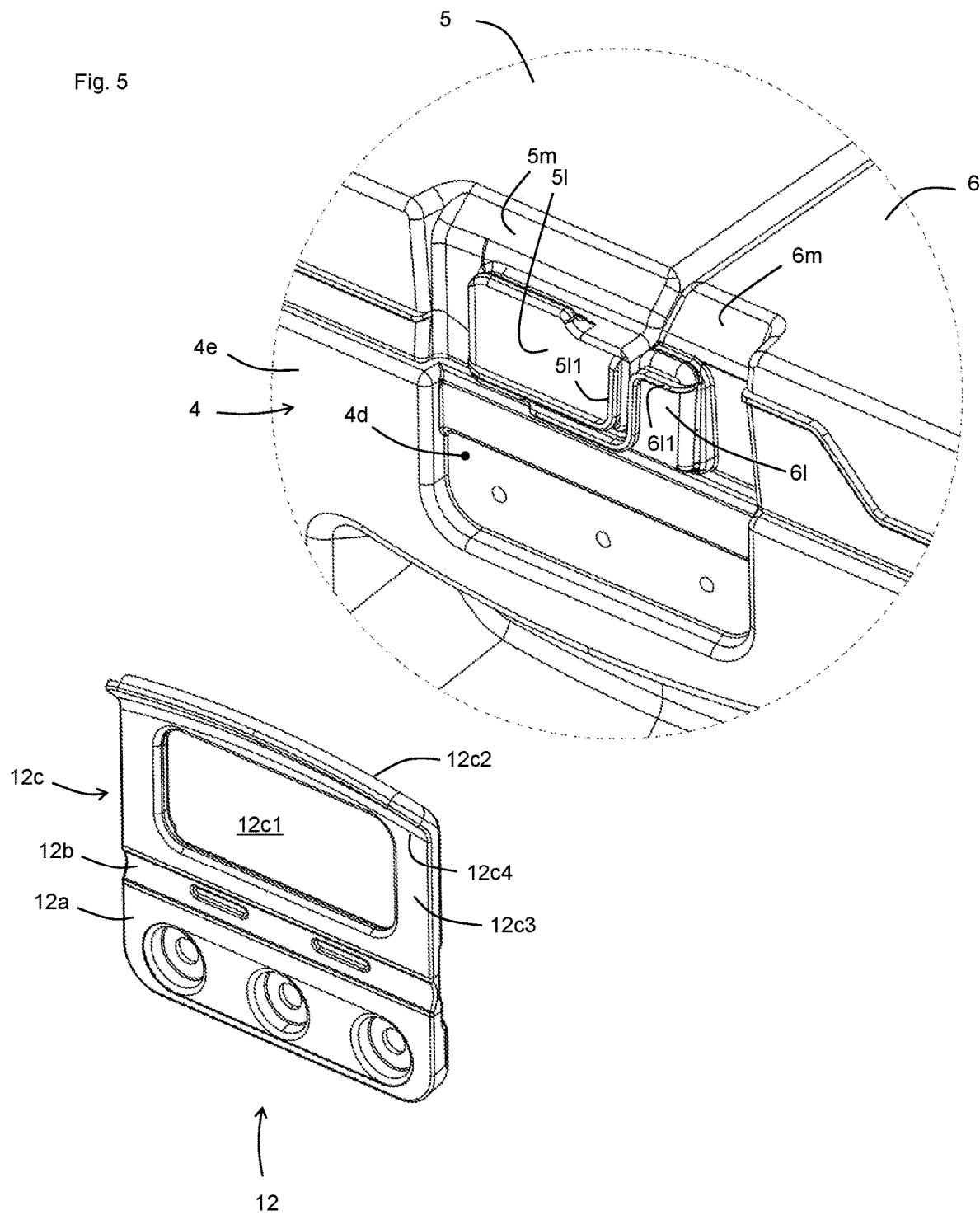
FIG. 5 shows a locking member 12 separated from a short side wall 4 from the state shown in FIG. 4.

As shown in FIG. 1 and FIG. 5, the upper wall 5 is provided with a convex portion 5l protruding in a longitudinal direction of the upper wall 5 (the left-right direction), in the vicinity of the tip surface 5a (more specifically, across the overlapping portion 5h and the adjacent portion 5i). The upper wall 6 is provided with a convex portion 6l protruding along a longitudinal direction of the upper wall 6 (the left-right direction), in the vicinity of the tip surface 6a (more specifically, across the overlapping portion 6h and the adjacent portion 6i). The convex portions 5l, 6l protrude toward a locking member 12, and, as described below, the convex portions 5l, 6l are fixed by the locking member 12 to prevent the upper walls 5, 6 from opening unexpectedly.

The convex portions 5l, 6l are provided with ridges 51l, 61l, respectively. The ridges 51l, 61l are formed at a portion corresponding to a parting line for manufacturing the upper walls 5, 6 by the method shown in "6. Manufacturing Method of Structure" described later. Since the convex portions 5l, 6l are easily impacted, for example when the container is dropped, the ridges 51l, 61l are provided to increase the wall thickness at the parting line and enhance the welding strength.

3. Locking Member 12

As shown in FIG. 1 and FIG. 4 to FIG. 5, the container 1 is provided with the locking member 12. The locking member 12 includes a fixed portion 12a, a hinge portion 12b, and an engagement portion 12c. The locking member 12 is bendable at the hinge portion 12b. The fixed portion 12a is fixed to the short side wall 4 by a fixing member (screw, bolt and nut, rivet, and the like) (not shown). The engagement portion 12c can be engaged with the convex portions 5l, 6l of the upper walls 5, 6. Specifically, the engagement portion 12c is provided with an opening 12c1, and the convex portions 5l, 6l are inserted into the opening 12c1, so that the engagement portion 12c is engaged with the convex portions 5l, 6l. The engagement of the engagement portion 12c with the upper walls 5, 6 prevents the upper walls 5, 6 from opening unexpectedly. The short side wall 4 is provided with an accommodation concave portion 4d recessed from a base surface 4e on a side of the outer surface. The fixed portion 12a and the hinge portion 12b are arranged in the accommodation concave portion 4d, and an outer surface 12a1 of the fixed portion 12a is flush with the base surface 4e.

When a force is applied to the engagement portion 12c in the disengagement direction (outward in the longitudinal direction of the upper walls 5, 6) from the state shown in FIG. 4, the engagement portion 12c rotates around the hinge portion 12b, thereby disengaging the engagement portion 12c from the upper walls 5, 6 and allowing the upper walls 5, 6 to be opened.

An inclined portion 12c2 is provided in the vicinity of an upper end of the engagement portion 12c. The inclined portion 12c2 is inclined away from the upper walls 5, 6. The upper walls 5, 6 are provided with inclined surfaces 5m, 6m at sites adjacent to the inclined portion 12c2. Consequently, a substantially V-shaped groove 12d is formed between the inclined portion 12c2 and the inclined surfaces 5m, 6m. The engagement portion 12c can be easily rotated by inserting a finger or the like into this groove 12d and pressing the engagement portion 12c.

Figure 6:
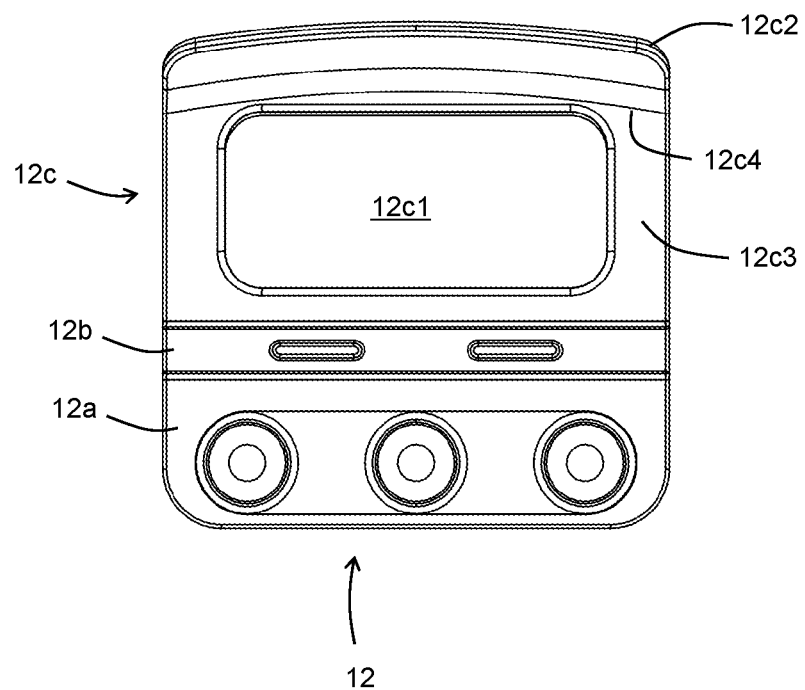
FIG. 6 is a left side view of the locking member 12.

As shown in FIG. 6, a boundary line 12c4 between a flat portion 12c3 and the inclined portion 12c2 of the engagement portion 12c is not a straight line but a curve. This makes it difficult to bend the inclined portion 12c2 at the boundary line 12c4 when it is pressed.

Figure 7:
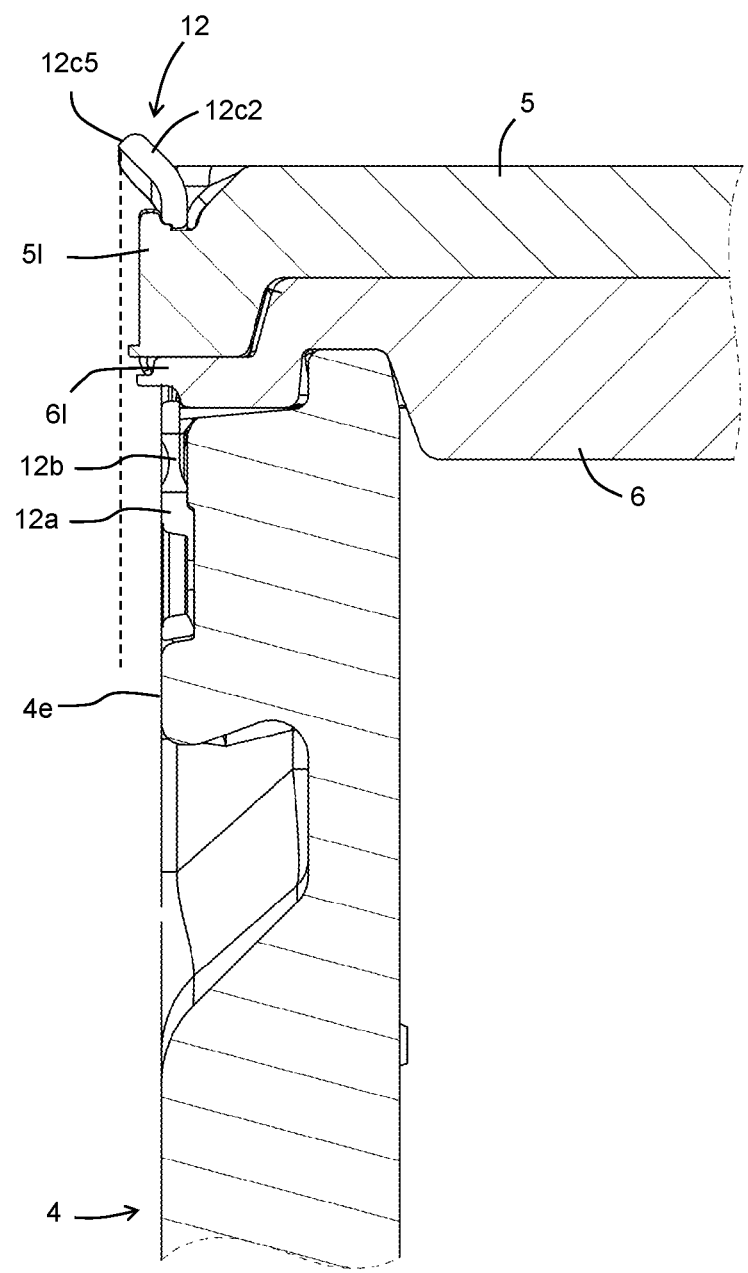
FIG. 7 is a cross-sectional view taken along a central surface of the locking member 12 in FIG. 4 in the front-rear direction.

Further, as shown in FIG. 7, an upper end 12c5 of the inclined portion 12c2 is arranged on an outer side in the left-right direction with respect to the hinge portion 12b. Therefore, the engagement can be released only by pressing the inclined portion 12c2 from above. In addition, the upper end 12c5 of the inclined portion 12c2 is preferably arranged on an outer side in the left-right direction with respect to the base surface 4e, and more preferably arranged on an outer side in the left-right direction with respect to the convex portions 5*l*, 6*l*. In such a case, the release of the engagement is performed more smoothly.

The fixed portion 12*a* and the engagement portion 12*c* can be made of a material having sufficient rigidity to function as the locking member 12 and made of, for example, polyolefin, such as polypropylene. The hinge portion 12*b* can be made by an elastomer, such as silicone rubber. With such a configuration, the locking member 12 can be easily bent at the hinge portion 12*b*, and the hinge portion 12*b* is hardly damaged even after repeated bending and restoration.

Figure 8:
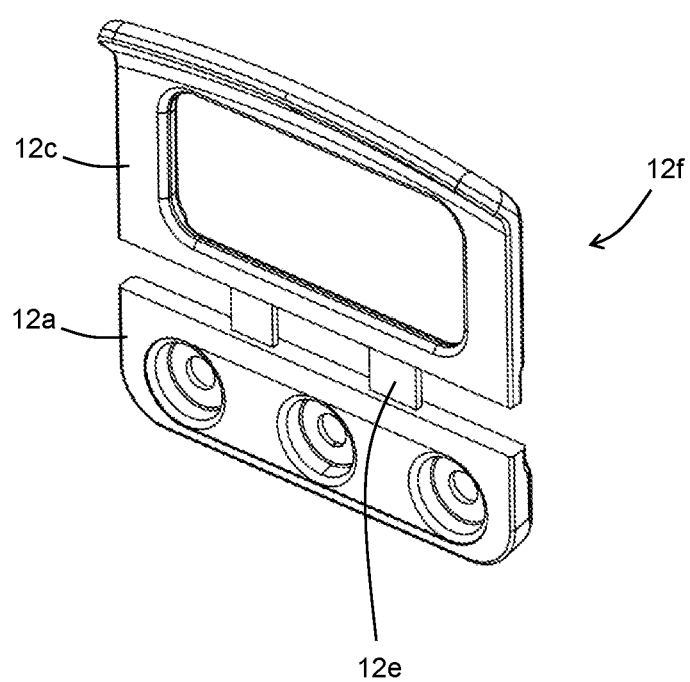
FIG. 8 is a perspective view of a base member 12f used for manufacturing the locking member 12.

The locking member 12 may be configured by connecting the fixed portion 12*a* and the engagement portion 12*c* separated from each other, using the hinge portion 12*b*. Alternatively, as shown in FIG. 8, a base member 12*f* in which the fixed portion 12*a* and the engagement portion 12*c* are connected by connecting portions 12*e* may be prepared, and then the hinge portion 12*b* may be formed to cover the connecting portion 12*e* with elastomer. In the latter case, there is no risk of separation of the fixed portion 12*a* and the engagement portion 12*c*, and thus the moldability and durability are excellent. The locking member 12 can be formed by two-color molding.

Since the upper wall 5 is located above the upper wall 6 at the overlapping portions 5*h*, 6*h* in the present embodiment, if the upper wall 5 is prevented from opening, the upper wall 6 will not open either. Therefore, the engagement portion 12*c* may be engaged only with the upper wall 5 and may be not engaged with the upper wall 6. Therefore, only the convex portion 5*l* may be inserted into the opening 12*c*1 without forming the convex portion 6*l*.

4. Method of Folding Container 1

A method of folding the container 1 will be described.

Figure 9:
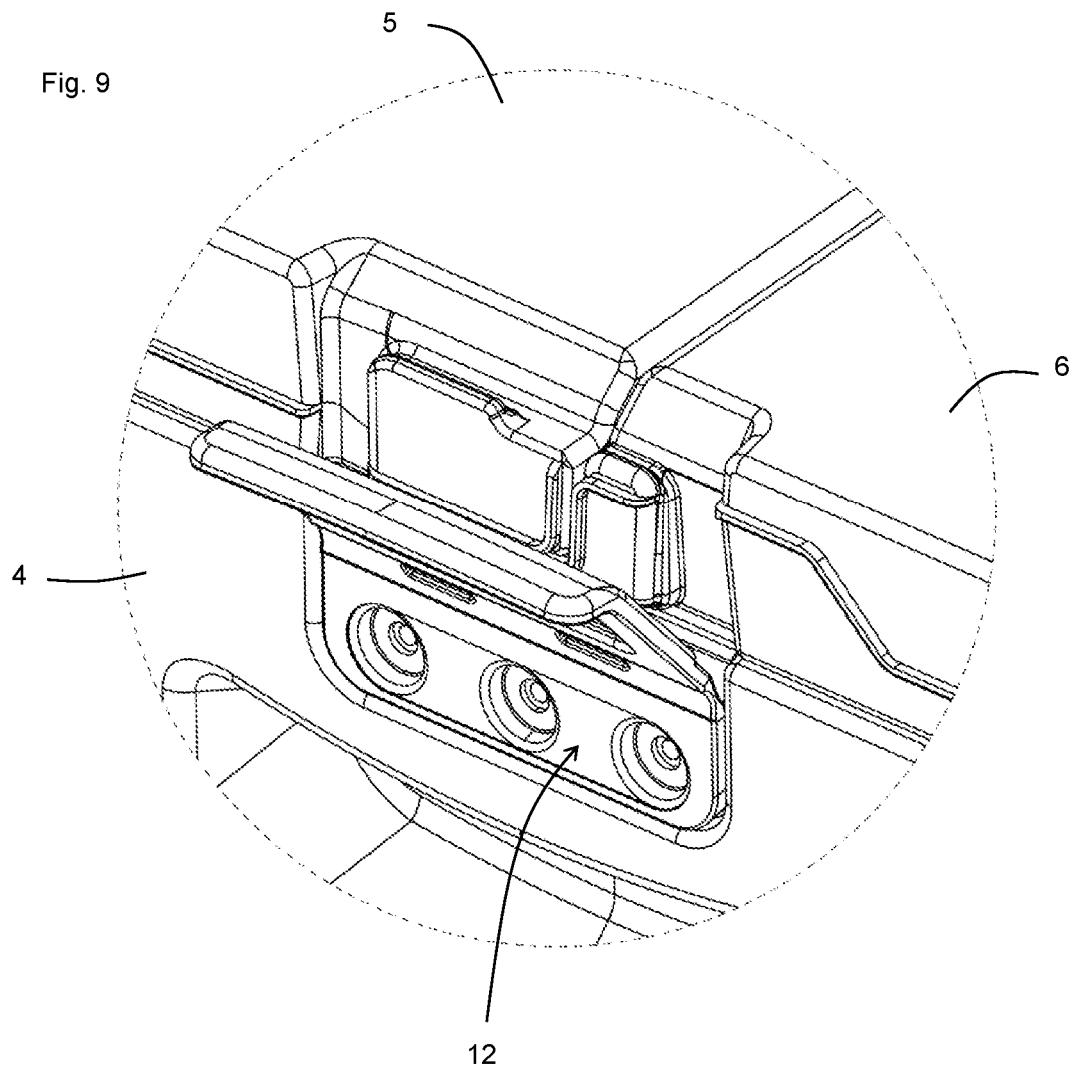
FIG. 9 shows the state where the locking of the upper walls 5, 6 by the locking member 12 shown in FIG. 4 is released.

First, from the state of FIG. 1, the engagement portion 12*c* is rotated as shown in FIG. 9 to release the lock on the upper walls 5, 6 by the locking member 12. Then, the upper walls 5, 6 are opened to the state of FIG. 10. Then, the short side walls 4 are tilted and laid from the state of FIG. 10 to the state of FIG. 11. At this time, the connection between the long side wall 3 and the short side wall 4 by the connecting mechanism 9 is released. Then, the long side walls 3 are tilted and laid from the state of FIG. 11 to the state of FIG. 12. Through the above steps, the container 1 can be folded compactly.

Figure 10:
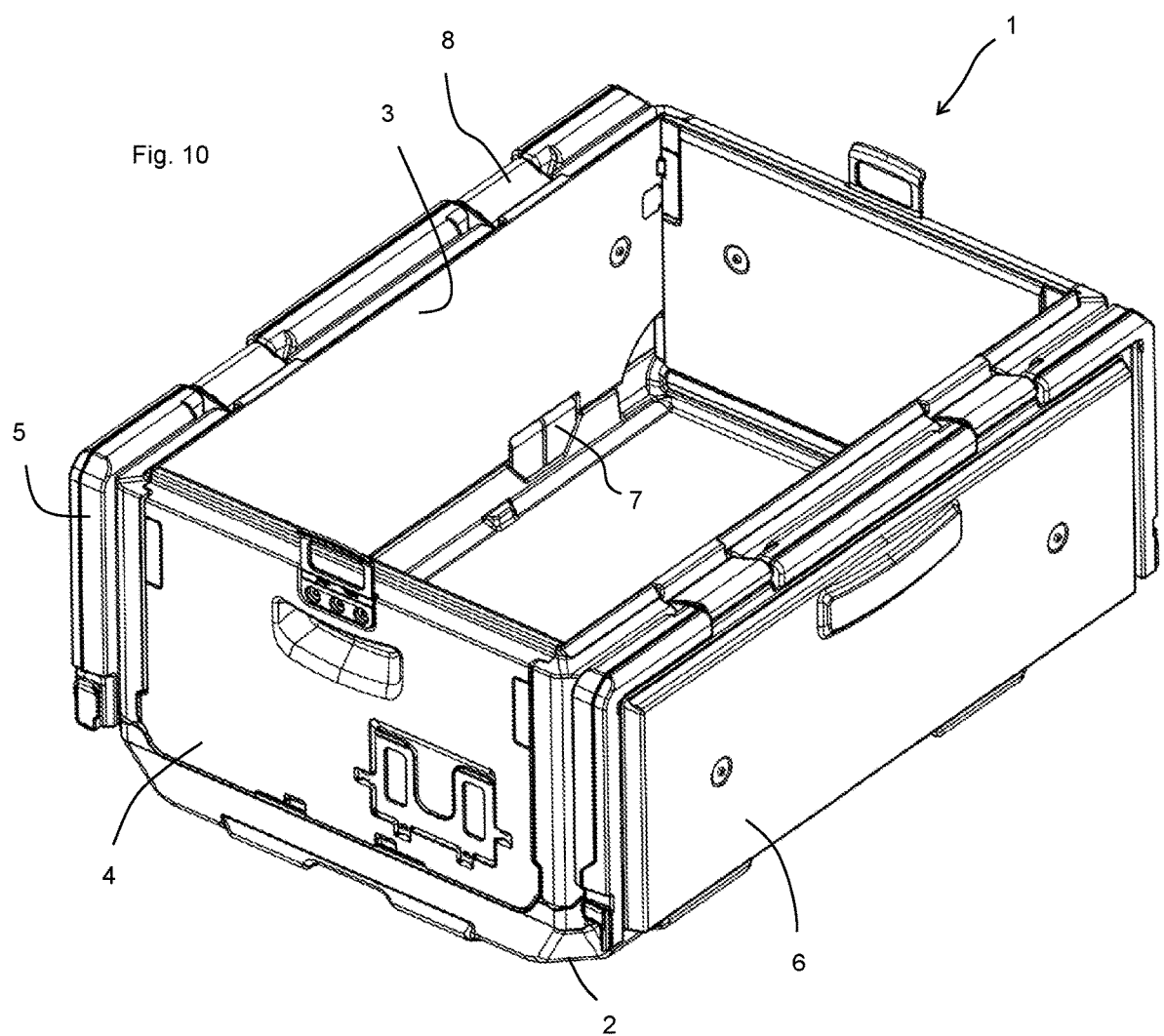
FIG. 10 is a perspective view of the state where the upper walls 5, 6 of the container 1 in FIG. 1 are opened.
Figure 11:
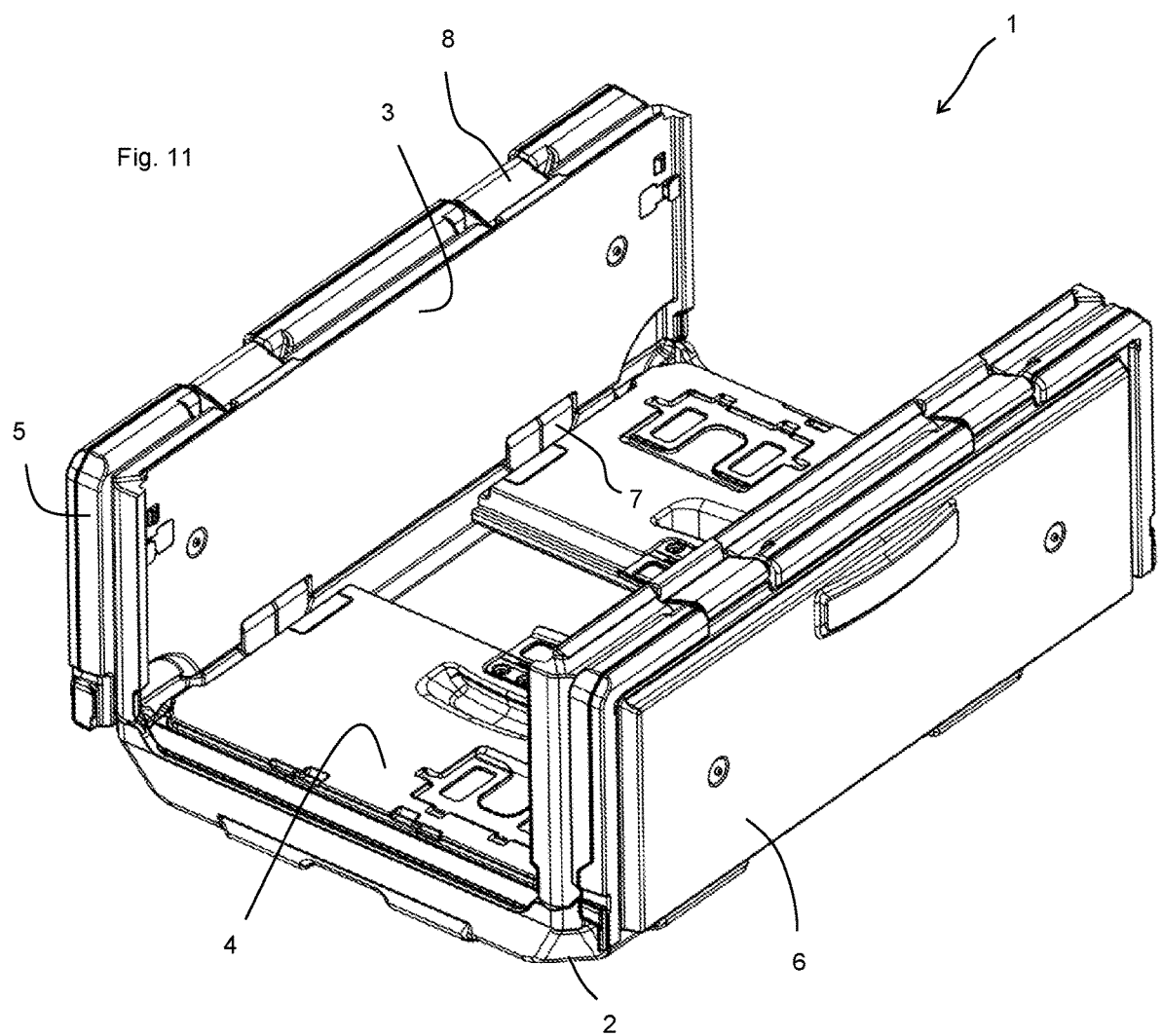
FIG. 11 is a perspective view showing the state where the short side walls 4 are tilted and laid from the state shown in FIG. 10.
Figure 12:
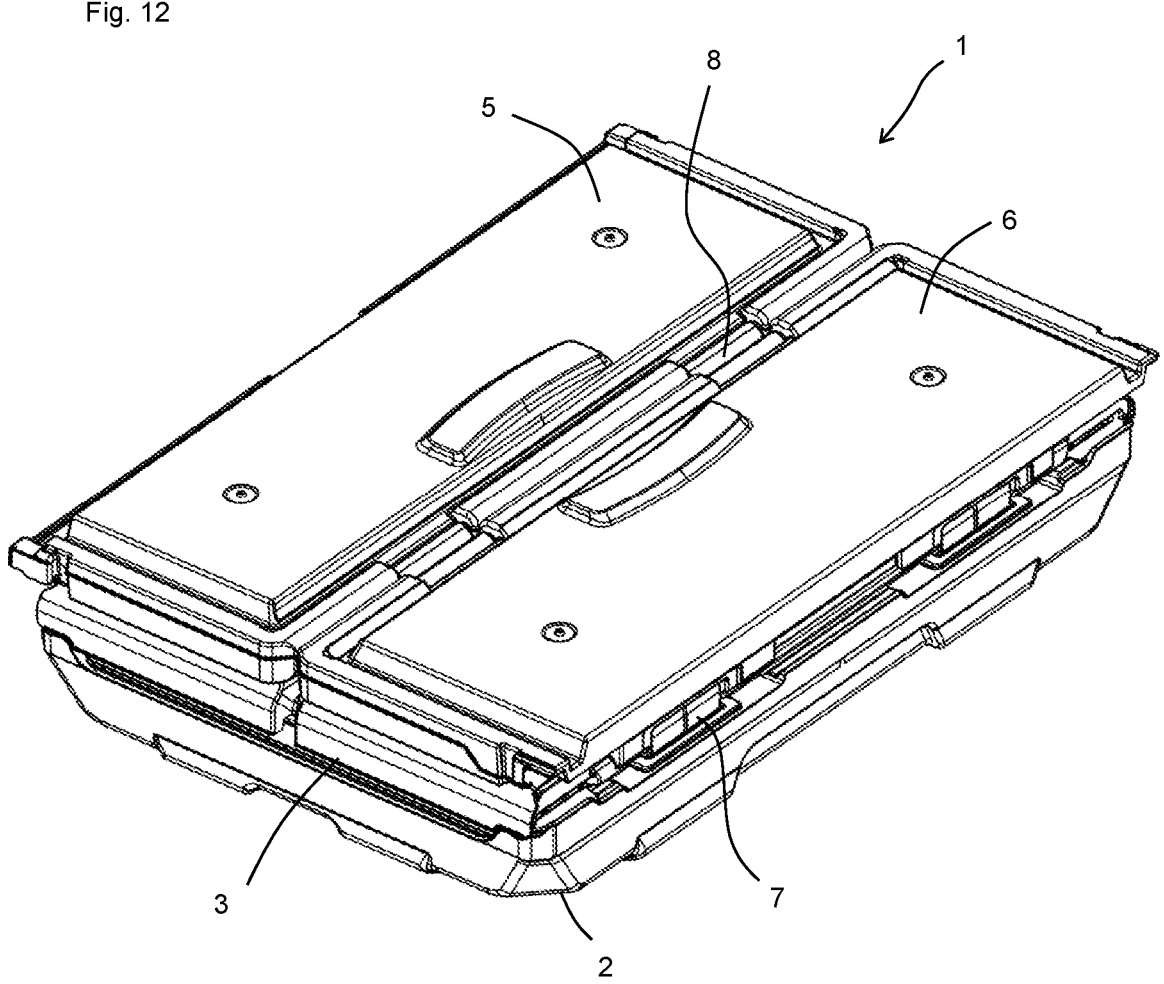
FIG. 12 is a perspective view showing the state where long side walls 3 are tilted and laid from the state shown in FIG. 11.

When the container 1 is unfolded, the long side walls 3 are raised from the state of FIG. 12 to the state of FIG. 11, and the short side walls 4 are raised from that state to the state of FIG. 10. The long side wall 3 and the short side wall 4 are connected by the connecting mechanism 9 in conjunction with the movement to raise the short side wall 4, so that the long side wall 3 and the short side wall 4 remain standing.

5. Method of Assembling Container 1

A method of assembling the container 1 will be described.

Attaching Latch Structure 11 to Short Side Wall 4

Figure 13:
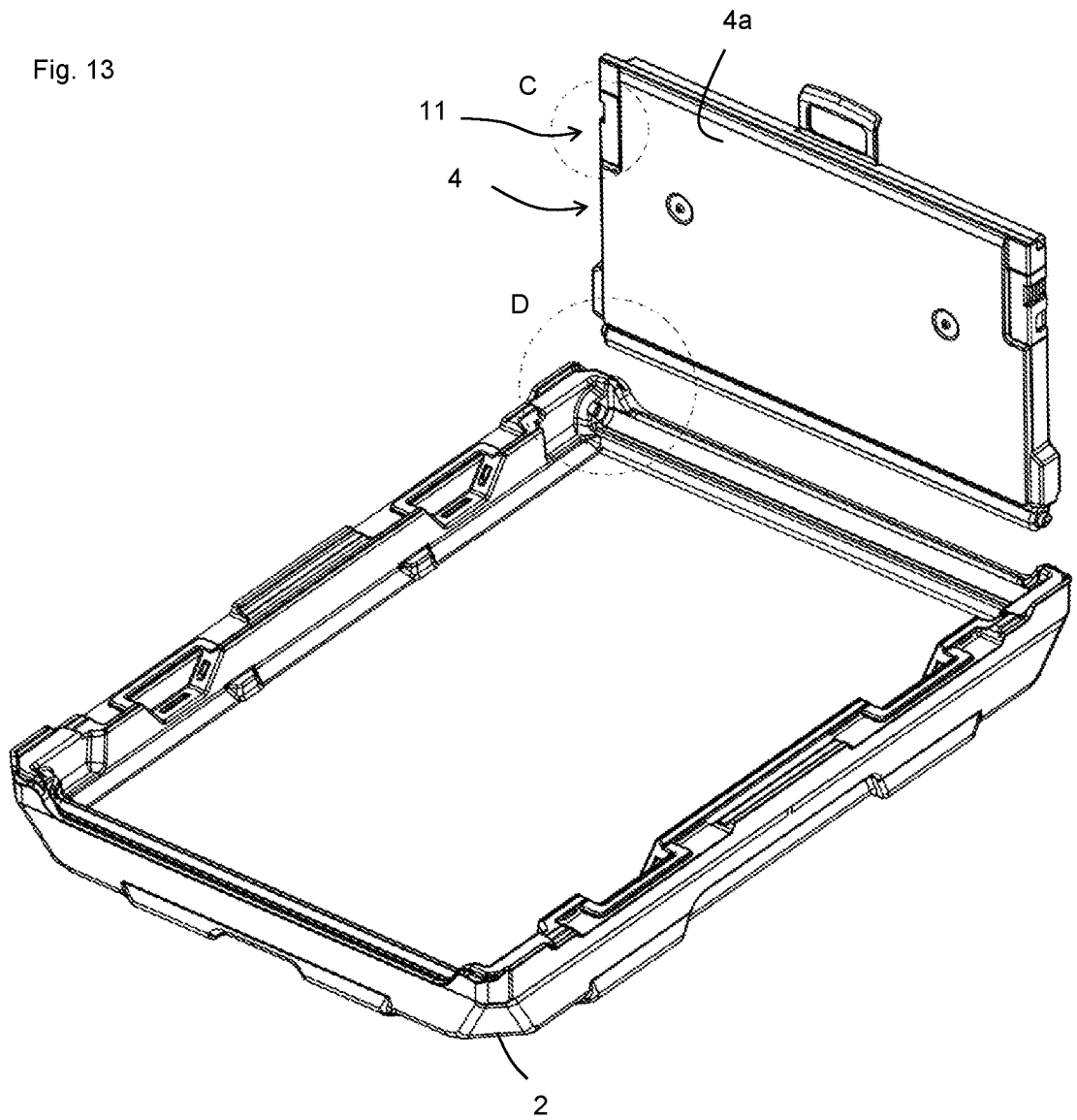
FIG. 13 is a perspective view showing a step of attaching the short side wall 4 to a bottom member 2.
Figure 14:
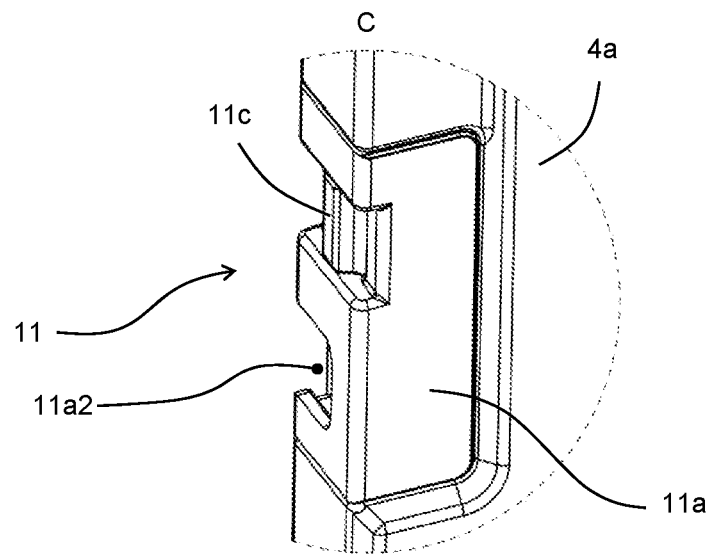
FIG. 14 is a perspective view of a region C in FIG. 13 as viewed from a different angle.

First, as shown in FIG. 13 to FIG. 14, a latch structure 11 is attached to a main body 4*a* of the short side wall 4. The latch structure 11 includes a metal fitting body 11*a* and a protruding member 11*c*. The protruding member 11*c* is urged in a direction projecting from the metal fitting body 11*a*.

Connection between Short Side Wall 4 and Bottom Member 2

Figure 15:
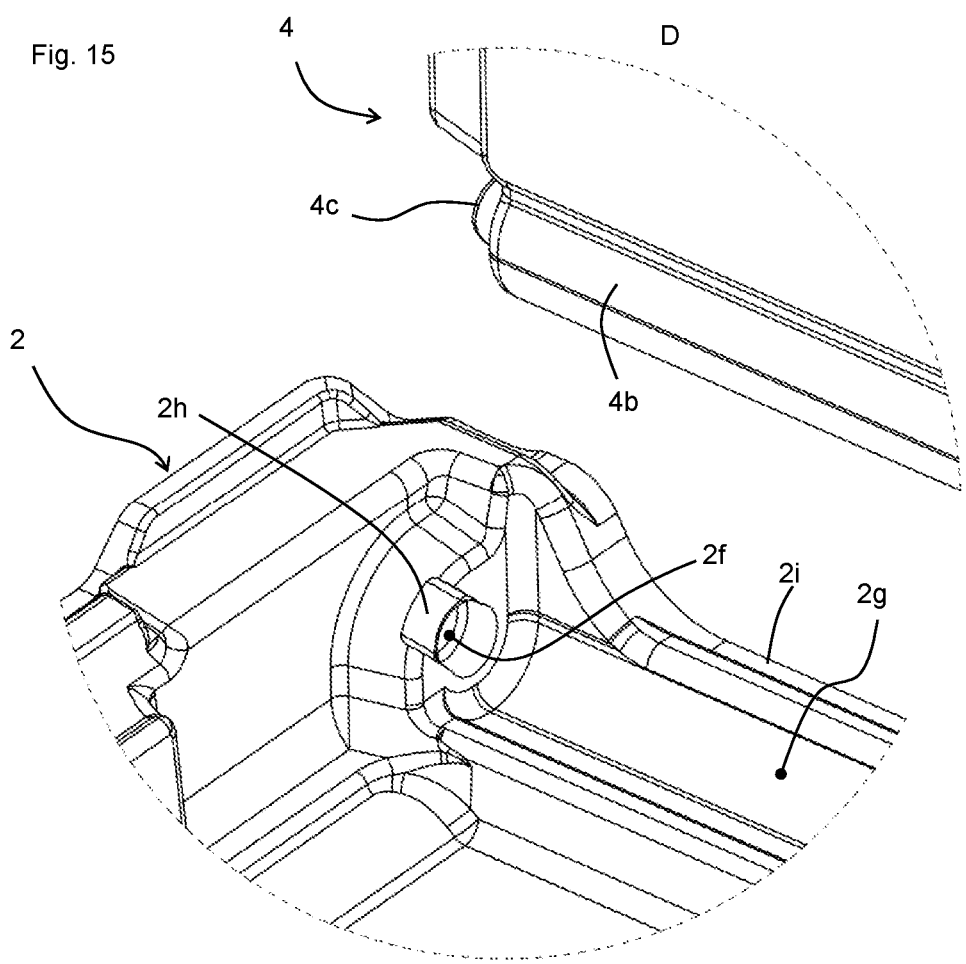
FIG. 15 is an enlarged view of a region D in FIG. 13.

As shown in FIG. 13 and FIG. 15, a ridge 4*b* which has a substantially arc-shaped cross section and is provided at a lower end of the short side wall 4 and a protruding shaft 4*c* which is provided at both ends of the ridge 4*b* are engaged respectively with a concave portion 2*g* and a shaft receiving hole 2*f* provided on the peripheral wall 2*i* of the bottom member 2 to connect the short side wall 4 to the bottom member 2. The pair of short side walls 4 are attached to the bottom member 2 and then tilted and laid to the state of FIG. 16. In this regard, the protruding shaft 4*c* is moved along a groove 2*h* extending diagonally toward an inner side of the left-right direction of the bottom member 2 to be engaged with the shaft receiving hole 2*f*. Consequently, when the short side wall 4 is lifted after unfolding the container, the protruding shaft 4*c* abuts against an inner surface of the shaft receiving hole 2*f* and is prevented from being pulled out.

Connection between Long Side Wall 3 and Lower Hinge Member 7

Next, as shown in FIG. 16 to FIG. 21B, the lower hinge member 7 is attached to a main body 3*a* of the long side wall 3. The lower hinge member 7 includes a case 7*a*, a side-wall locking portion 7*b*, and a bottom-member locking portion 7*c*. The side-wall locking portion 7*b* and the bottom-member locking portion 7*c* are urged in a direction projecting from the case 7*a*.

Figure 17A:
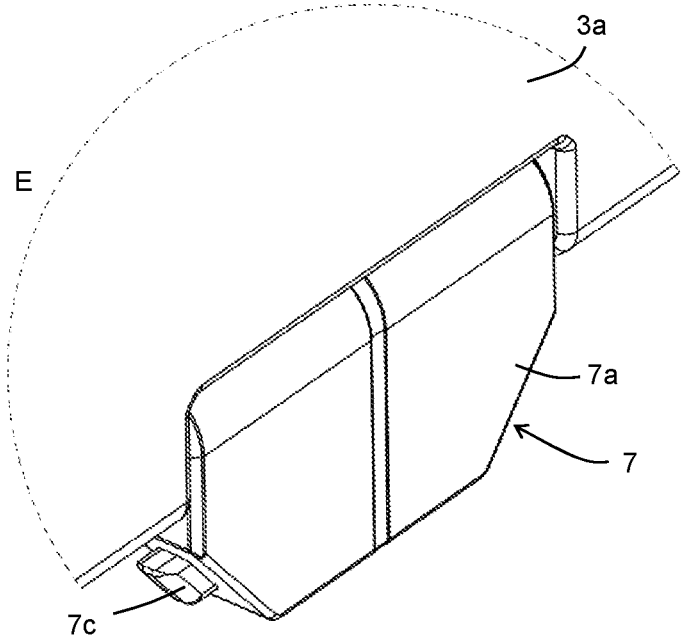
FIG. 17A is an enlarged view of a region E in FIG. 16.
Figure 17B:
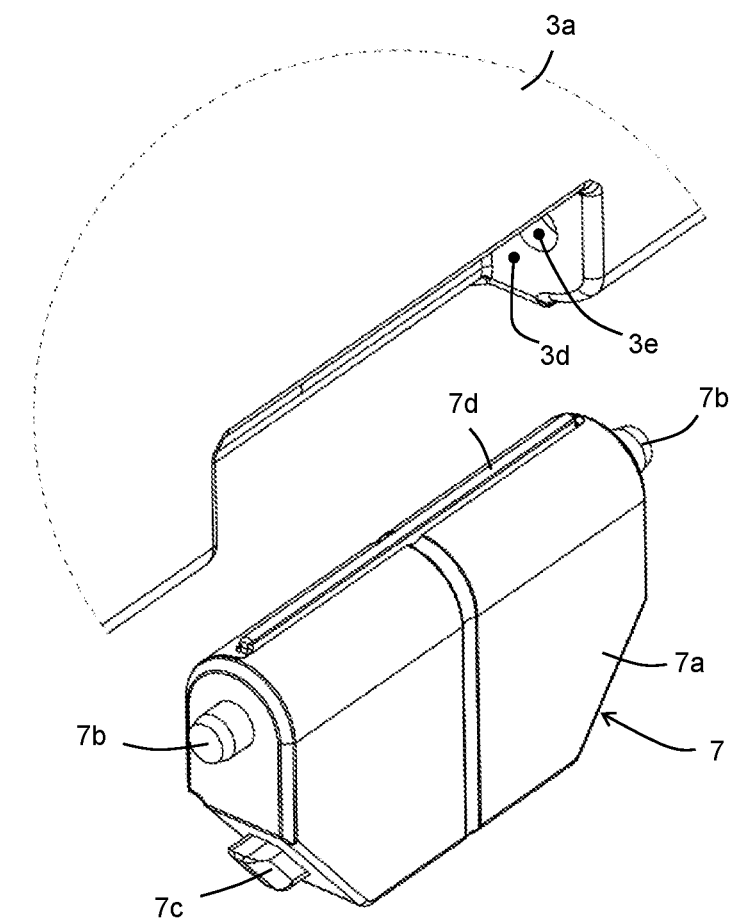
FIG. 17B is an exploded view of FIG. 17A.

As shown in FIG. 17A and FIG. 17B, an accommodation concave portion 3*d* for accommodating the lower hinge member 7 is provided on an inner surface side of a lower end of the long side wall 3. The lower hinge member 7 is rotatably connected to the long side wall 3 by engaging the side-wall locking portion 7*b* with shaft receiving holes 3*e* provided on both sides of the accommodation concave portion 3*d* in its width direction.

Figure 18A:
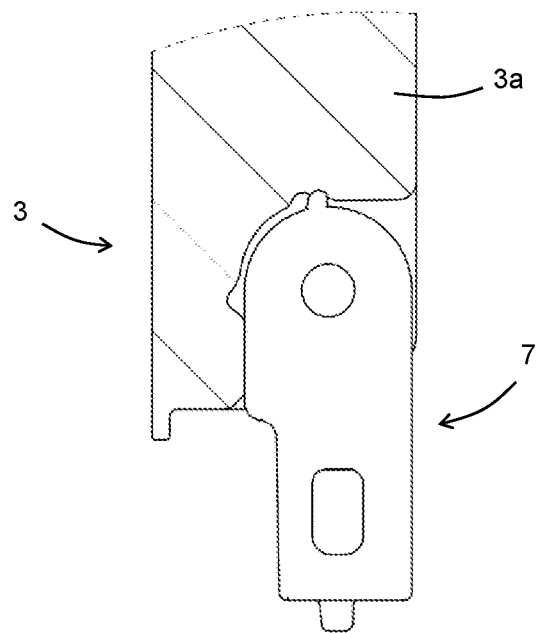
FIG. 18A is a cross-sectional views at the same cross section as FIG. 2 for the state of FIG. 17A.
Figure 18B:
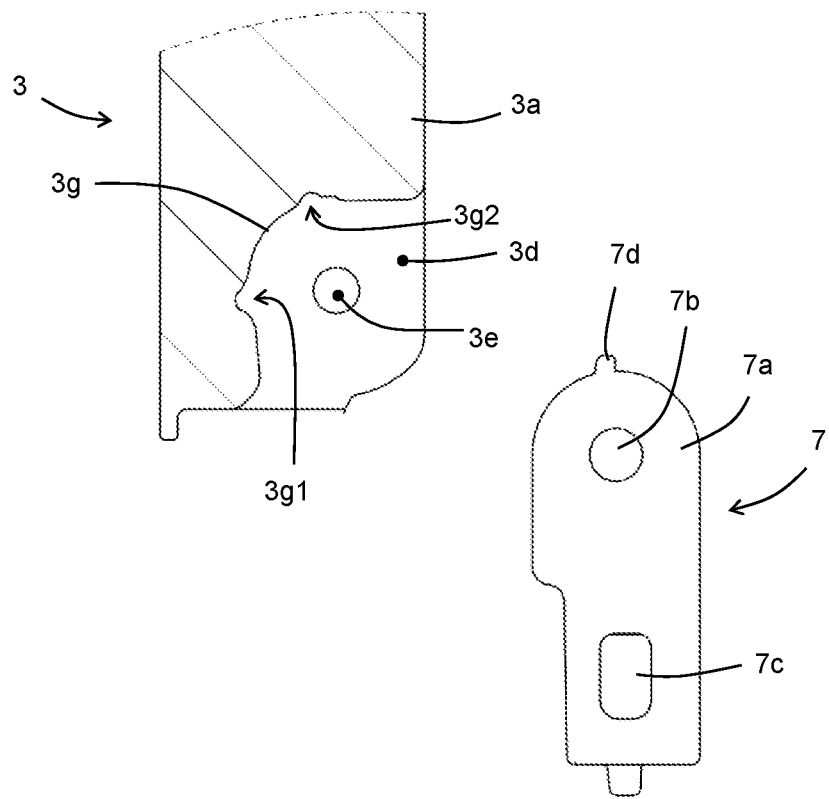
FIG. 18B is a cross-sectional view at the same cross section as FIG. 2 for the state of FIG. 17B.

As shown in FIG. 18A and FIG. 18B, a ridge 7*d* is provided on an upper side of the lower hinge member 7. a curved surface 3*g* is provided in the accommodation concave portion 3*d*. When the long side wall 3 is rotated with respect to the lower hinge member 7, the ridge 7*d* is moved along the curved surface 3*g*. The curved surface 3*g* is provided with engagement concave portions 3*g*1, 3*g*2. When the ridge 7*d* is in contact with the curved surface 3*g* at a site other than the engagement concave portions 3*g*1, 3*g*2, it is pressed against the curved surface 3*g*. Therefore, when the long side wall 3 is rotated with respect to the lower hinge member 7 so that the engagement concave portions 3*g*1, 3*g*2 face the ridge 7*d*, the ridge 7*d* is engaged with the engagement concave portions 3*g*1, 3*g*2.

Figure 19A:
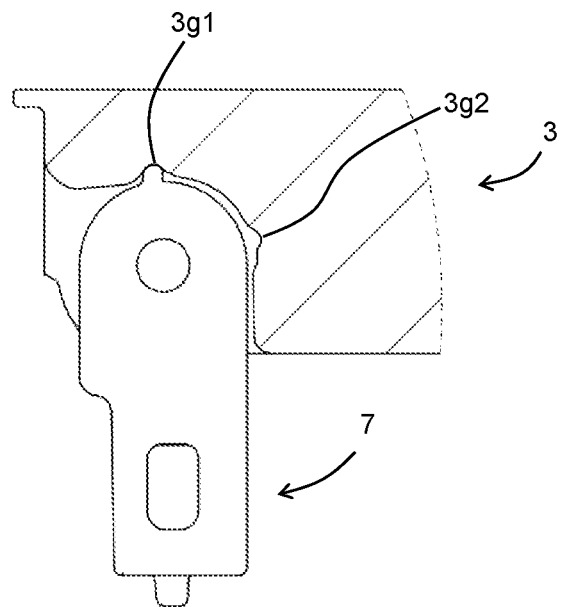
FIG. 19A shows the state where the long side wall 3 is tilted and laid from the state shown in FIG. 18A.

When the long side walls 3 are tilted and laid as shown in FIG. 12, the ridge 7*d* is engaged with the engagement concave portion 3*g*1 as shown in FIG. 19A, and the folded state of the long side wall 3 is maintained. Consequently, the folded state shown in FIG. 12 is stably maintained.

Figure 19B:
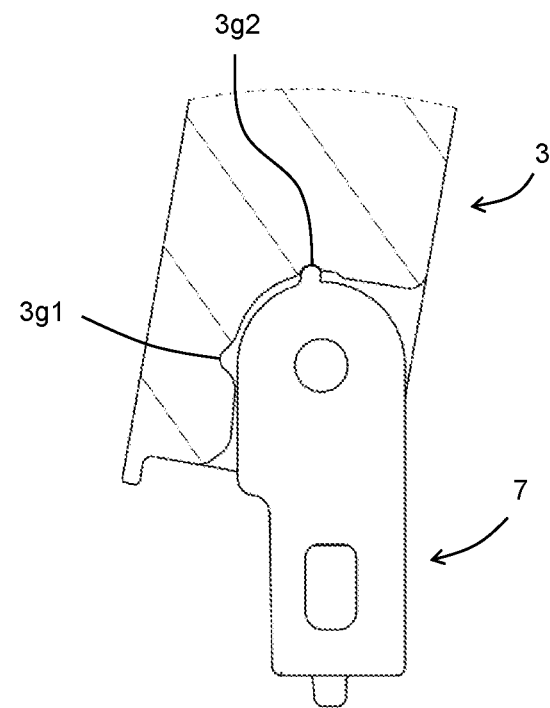
FIG. 19B shows the state after the long side wall 3 is rotated from the state shown in FIG. 19A to the state just before the long side wall 3 is upright.

When the long side wall 3 is rotated with respect to the lower hinge member 7 from the state of FIG. 12, the ridge 7*d* is engaged with the engagement concave portion 3*g*2, as shown in FIG. 19B, just before the long side wall 3 becomes upright (in the present embodiment, when the angle with respect to the horizontal plane becomes 80 degrees). Consequently, the long side wall 3 is kept almost upright but slightly inclined toward the inside of the container 1. By raising the short side wall 4 in this state, the long side wall 3 and the short side wall 4 can be connected smoothly. Details will be described later.

Connection between Lower Hinge Member 7 and Bottom Member 2

Figure 16:
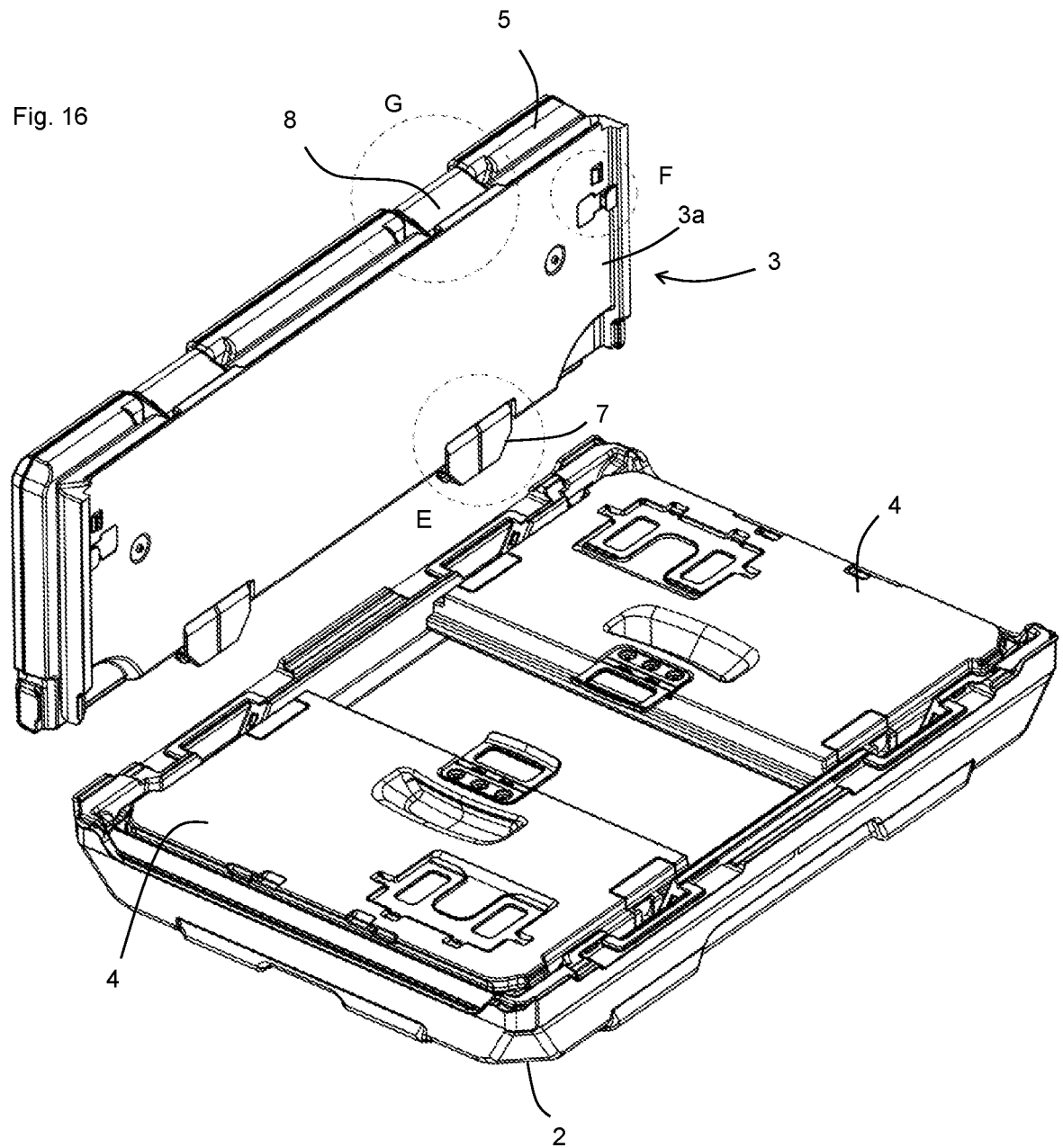
FIG. 16 is a perspective view showing a step attaching the long side wall 3 to the bottom member 2.
Figure 20:
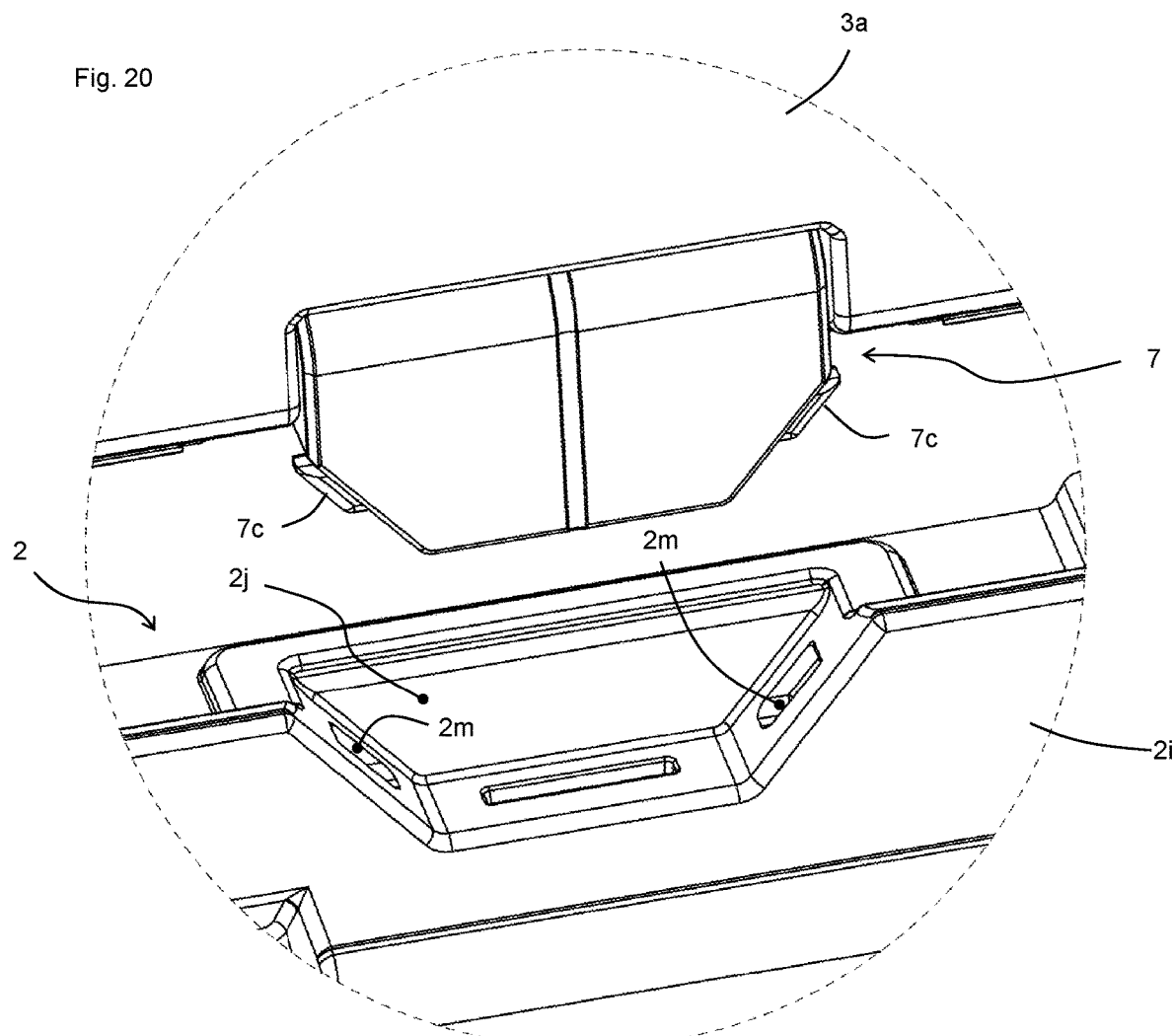
FIG. 20 is a perspective view of the vicinity of a region E in FIG. 16 and shows a step of attaching a lower hinge member 7 to the bottom member 2.

Next, as shown in FIG. 16 and FIG. 20, the lower hinge member 7 is connected to the bottom member 2. An accommodation concave portion 2j for accommodating the lower hinge member 7 is provided on an inner surface side of an upper end of the peripheral wall 2i of the bottom member 2. The lower hinge member 7 is connected to the bottom member 2 by engaging the bottom-member locking portion 7c with an engagement hole 2m provided on the accommodation concave portion 2j.

Connection between Long Side Wall 3 and Short Side Wall 4

Figure 21A:
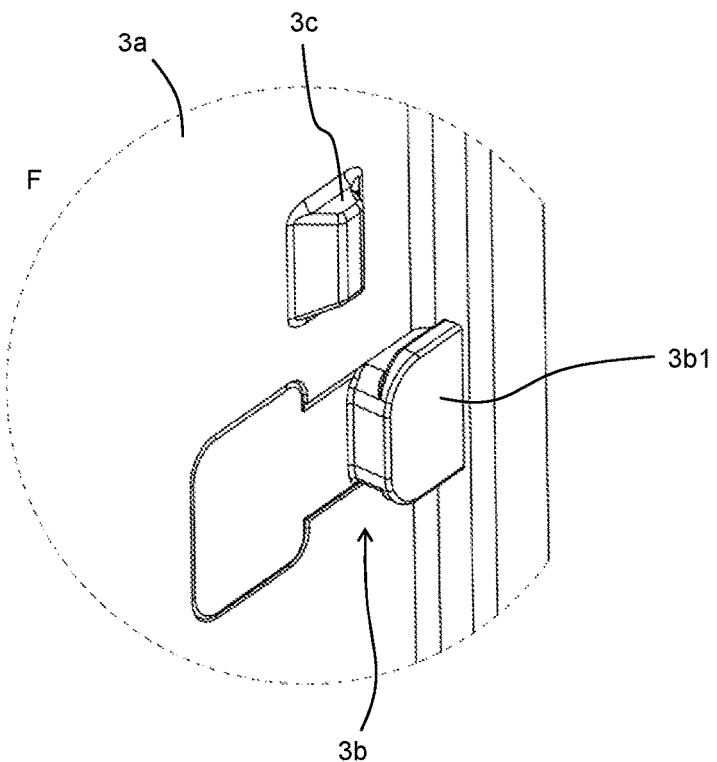
FIG. 21A is an enlarged view of a region F in FIG. 16.
Figure 21B:
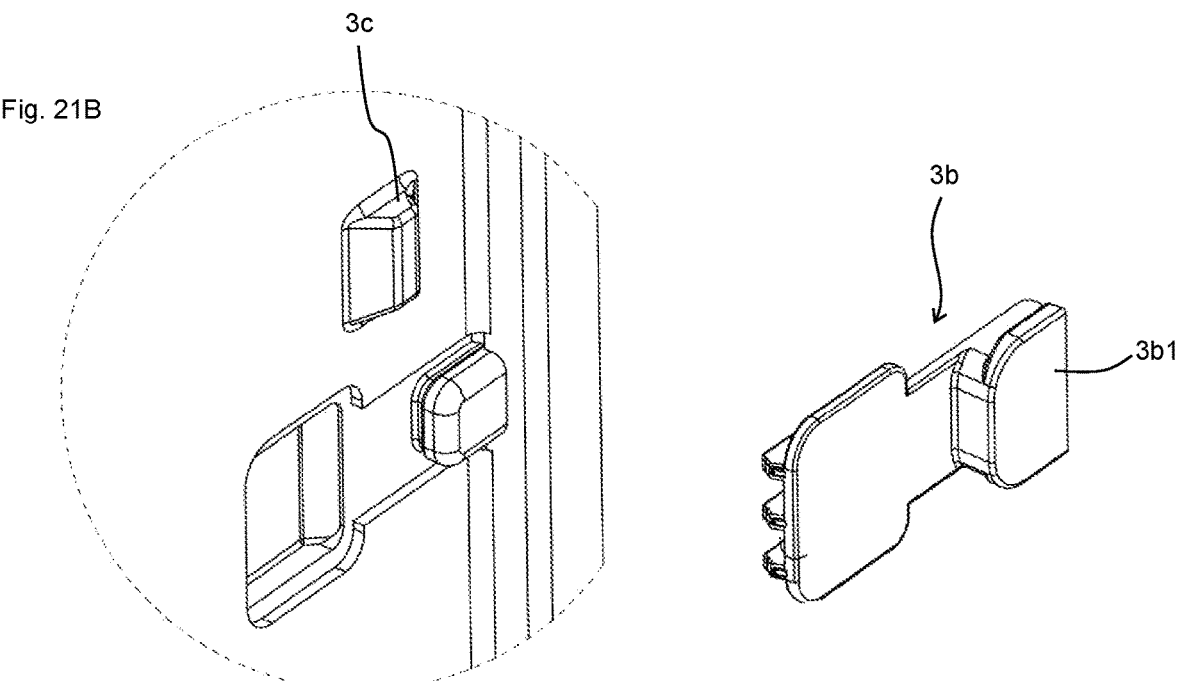
FIG. 21B is an exploded view of FIG. 21A.
Figure 22:
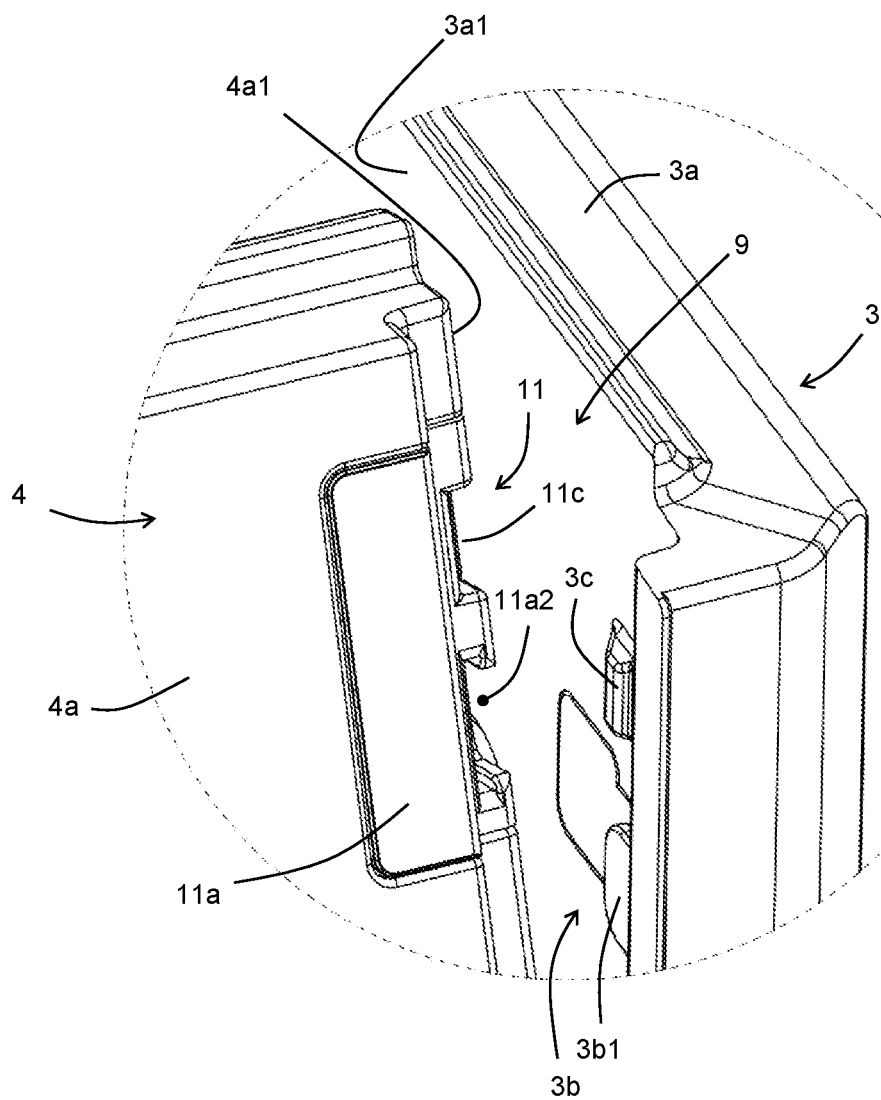
FIG. 22 shows the state after the short side wall 4 is rotated from the state shown in FIG. 11 to the state just before the short side wall 4 is upright.

Next, as shown in FIG. 16 and FIG. 21B, an engagement metal fitting 3b is attached to the main body 3a of the long side wall 3. The engagement metal fitting 3b is attached at a position adjacent to an engagement convex portion 3c protruding from an inner surface of the main body 3a. As shown in FIG. 22, the connecting mechanism 9 includes the latch structure 11, the engagement metal fitting 3b, and the engagement convex portion 3c.

Figure 23A:
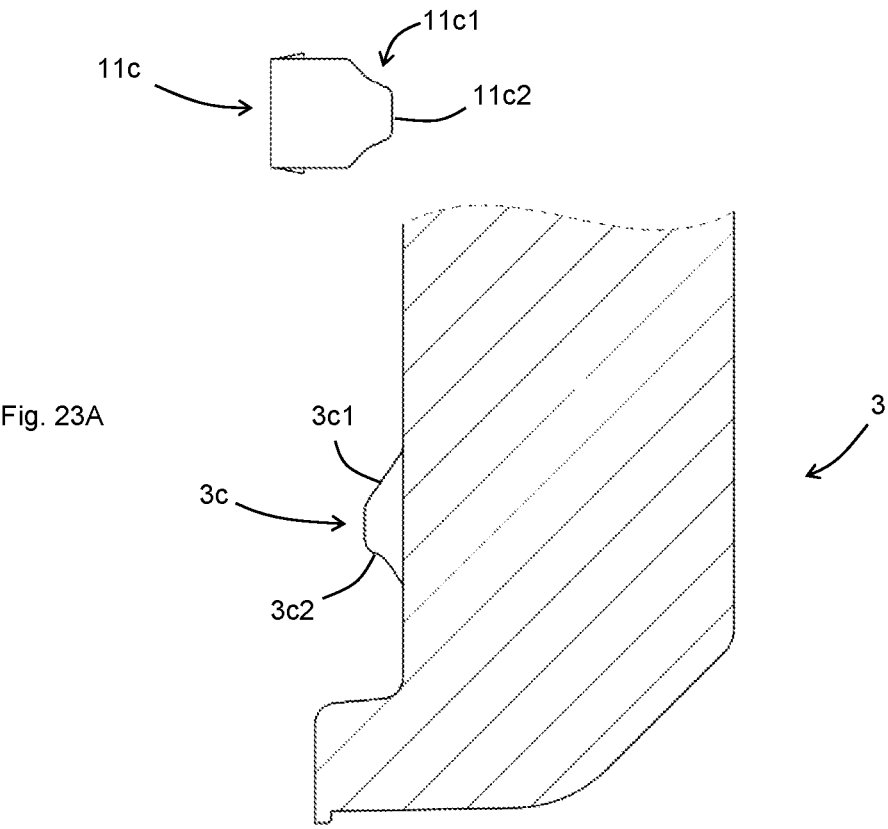
FIG. 23A is a cross-sectional views passing above an engagement convex portion 3c and parallel to the horizontal plane, showing the state where a protruding member 11c and the long side wall 3 are extracted from FIG. 22 and shows the state before the protruding member 11c is engaged with the engagement convex portion 3c.
Figure 23B:
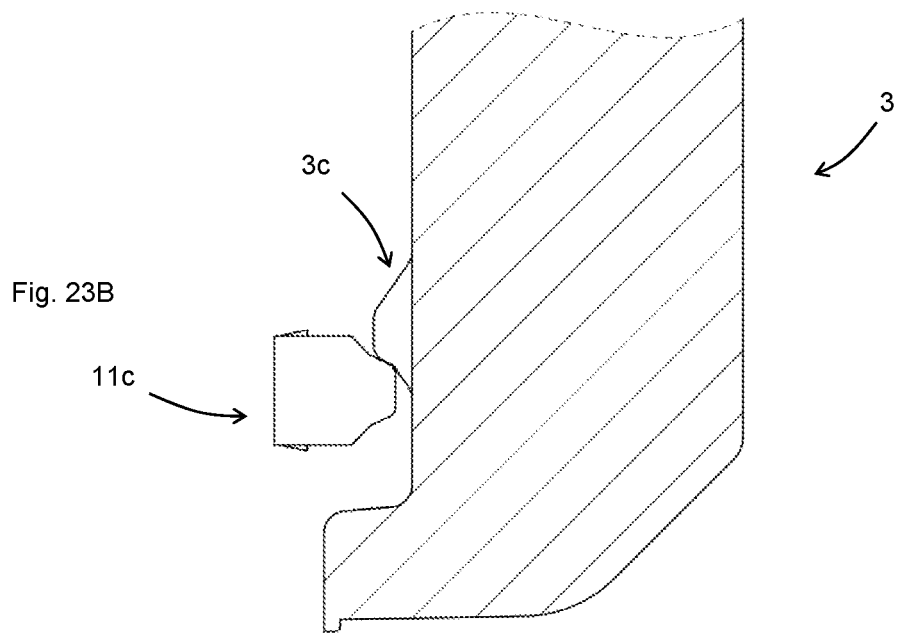
FIG. 23B is a cross-sectional view passing above an engagement convex portion 3c and parallel to the horizontal plane, showing the state where a protruding member 11c and the long side wall 3 are extracted from FIG. 22 and shows the state after the protruding member 11c is engaged with the engagement convex portion 3c.

When the short side wall 4 is raised from the state of FIG. 11, the protruding member 11c of the latch structure 11 retreats while being pushed by an inclined surface 3c1 of the engagement convex portion 3c and is arranged beyond the engagement convex portion 3c, so that the protruding member 11c is engaged with the engagement convex portion 3c, as shown in FIG. 23B. In this state, the protruding member 11c is in contact with an inclined surface 3c2 of the engagement convex portion 3c.

When the short side wall 4 needs to be tilted and laid, a strong force is applied in a direction of tilting and laying the short side wall 4, so that the protruding member 11c retreats while being pushed by the inclined surface 3c2 and is arranged beyond the engagement convex portion 3c. Consequently, the protruding member 11c is disengaged from the engagement convex portion 3c.

Since the inclined surface 3c1 is gentler than the inclined surface 3c2, the protruding member 11c and the engagement convex portion 3c are easily engaged and are not easily disengaged with each other. Further, as shown in FIG. 23A, a tip portion 11c1 of the protruding member 11c has a substantially trapezoidal shape, and a tip surface 11c2 thereof is substantially flat. With such a configuration, the engagement strength between the protruding member 11c and the engagement convex portion 3c is increased as compared with the configuration in which the tip portion 11c1 has a substantially triangular shape, and thus the engagement between the protruding member 11c and the engagement convex portion 3c is less likely to be released unexpectedly.

As shown in FIG. 22, when the protruding member 11c is arranged beyond the engagement convex portion 3c, an engagement convex portion 3b1 of the engagement metal fitting 3b enters and engages with an engagement concave portion 11a2 of the metal fitting body 11a. Consequently, the connection between the long side wall 3 and the short side wall 4 is strengthened.

The engagement convex portion 3b1 is engaged with the engagement concave portion 11a2 by raising the short side wall 4 in a state where the long side wall 3 is upright to be perpendicular to the horizontal plane, as shown in FIG. 11. However, there are cases where the long side wall 3 is slightly inclined, when the long side wall 3 is made upright, toward the outside of the container 1 due to dimensional errors in molding. In particular, as shown in FIG. 11, when the upper walls 5, 6 attached to the long side walls 3 are located on an outer side of the long side wall 3, the long side wall 3 tends to be inclined toward the outside of the container 1 because the center of gravity of the long side wall 3 to which the upper walls 5, 6 are attached is located on an outer side beyond the shaft receiving hole 3e (the side-wall locking portion 7b) (see FIG. 17A and FIG. 17B). If the short side wall 4 is raised in this state, there arises a problem that the engagement convex portion 3b1 is not engaged with the engagement concave portion 11a2.

Therefore, in the present embodiment, the short side wall 4 is raised in a state where the long side wall 3 is slightly inclined toward the inside of the container 1, as shown in FIG. 19B, in order to avoid such a problem. In this case, when the short side wall 4 is raised, a side surface 4a1 of the main body 4a of the short side wall 4 abuts against an inner surface 3a1 of the main body 3a of the long side wall 3 and pushes it up. Consequently, when the short side wall 4 is raised to a substantially upright state shown in FIG. 22, the long side wall 3 is in an upright state, so that the engagement between the protruding member 11c and the engagement convex portion 3c and the engagement between the engagement convex portion 3b1 and the engagement concave portion 11a2 can be performed smoothly.

Connection between Long Side Walls 3 and Upper Walls 5, 6

Figure 24A:
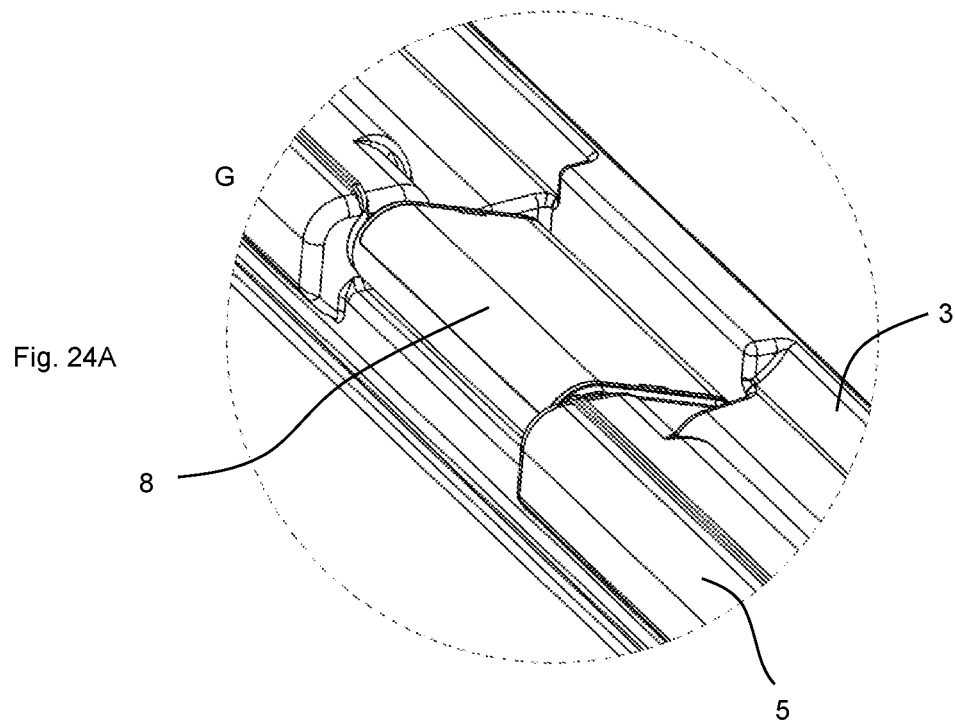
FIG. 24A is a perspective view of a region G in FIG. 16 as viewed from a different angle.
Figure 24B:
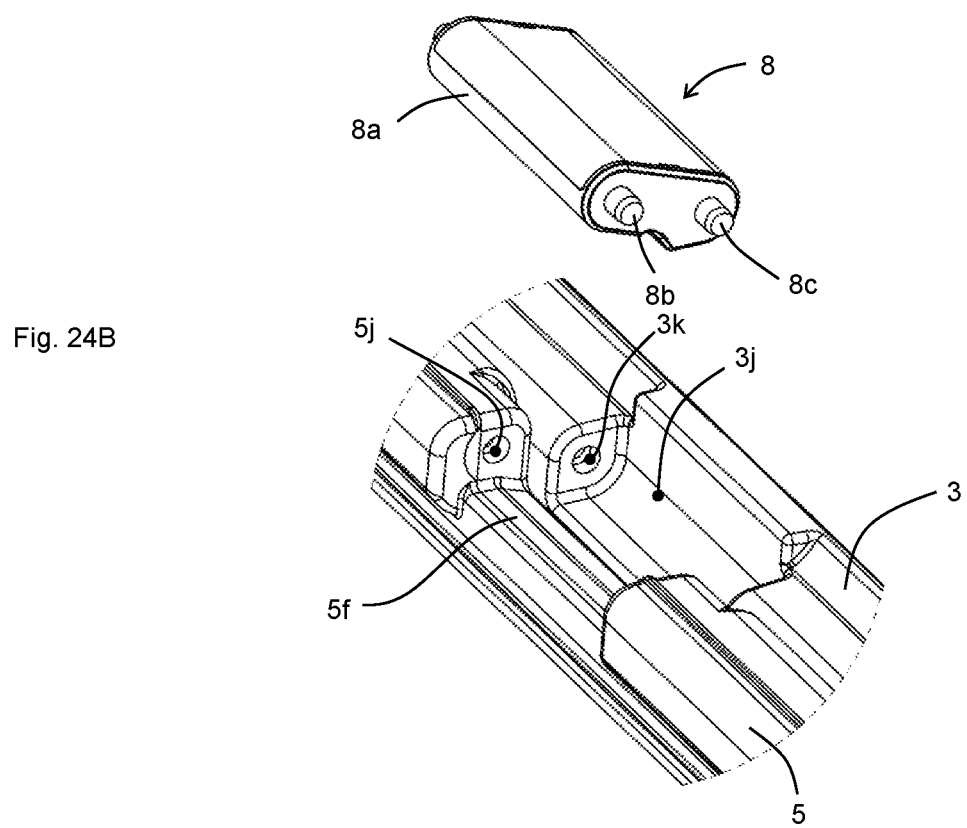
FIG. 24B is an exploded view of FIG. 24A.

Next, as shown in FIG. 16, FIG. 24A, and FIG. 24B, the long side walls 3 are connected to the upper walls 5, 6. One long side wall 3 is connected to the upper wall 5, and the other long side wall 3 is connected to the upper wall 6. Since the connection structure of the long side wall 3 and the upper wall 6 is the same as the connection structure of the long side wall 3 and the upper wall 5, the connection between the long side wall 3 and the upper wall 5 will be described below as an example.

The long side wall 3 and the upper wall 5 are connected via the upper hinge member 8. The upper hinge member 8 includes a case 8a, an upper-wall locking portion 8b, and a side-wall locking portion 8c. The upper-wall locking portion 8b and the side-wall locking portion 8c are urged in a direction projecting from the case 8a.

As shown in FIG. 24B, an accommodation concave portion 3j for accommodating the upper hinge member 8 is provided on an outer surface side of an upper end of the long side wall 3. The upper hinge member 8 is rotatably connected to the long side wall 3 by engaging the side-wall locking portion 8c with shaft receiving holes 3k provided on both sides of the accommodation concave portion 3j in its width direction.

As shown in FIG. 24B, an accommodation concave portion 5f for accommodating the upper hinge member 8 is provided at a proximal end of the upper wall 5. The upper hinge member 8 is rotatably connected to the upper wall 5 by engaging the upper-wall locking portion 8b with shaft receiving holes 5j provided on both sides of the accommodation concave portion 5f in its width direction.

Through the above steps, the long side walls 3 are connected to the upper walls 5, 6, and the container 1 assembled as shown in FIG. 10 is obtained.

6. Manufacturing Method of Structure

The bottom member 2, the long side wall 3, the short side wall 4, and the upper walls 5, 6 constituting the container 1 may be a structure 26 in which a core material, such as a foamed body, is sandwiched between resin sheets. Hereinafter, the structure 26 having the same shape as the bottom member 2 will be taken as an example, and a manufacturing method thereof will be described.

Configuration of Molding Machine 60

First, with reference to FIG. 25, a molding machine 60 applicable to the manufacturing method of the structure of the present embodiment will be described.

The molding machine 60 includes a sheet forming device 64 and molds 71, 72. The sheet forming device 64 includes a hopper 62, an extruder 63, an accumulator 67, and a T-die 68. The extruder 63 and the accumulator 67 are connected via a connecting pipe 75. The accumulator 67 and the T-die 68 are connected via a connecting pipe 77. The configuration of each component will be described in detail blow

Hopper 62, Extruder 63

The hopper 62 is used to feed raw resin 61 into a cylinder 63a of the extruder 63. The form of the raw resin 61 is not particularly limited and is usually in the form of pellets. The raw resin is, for example, a thermoplastic resin, such as polyolefin, and examples of the polyolefin include low-density polyethylene, linear low-density polyethylene, high-density polyethylene, polypropylene, ethylene-propylene copolymer, and a mixture thereof. The raw resin 61 is fed into the cylinder 63a from the hopper 62 and is heated and melted in the cylinder 63a to become molten resin. Further, the raw resin is further conveyed toward a distal end of the cylinder 63a by the rotation of a screw pump arranged inside the cylinder 63a. The screw pump is arranged inside the cylinder 63a, and the molten resin is kneaded and conveyed by its rotation. A gear device is provided at a proximal end of the screw pump, and the screw pump is rotationally driven by the gear device.

The raw resin is extruded from a resin extrusion port of the cylinder 63a and is injected into the accumulator 67 through the connecting pipe 75. The accumulator 67 includes a cylinder 67a and a piston 67b slidable inside the cylinder, and molten resin 61a can be stored in the cylinder 67a. The piston 67b is moved after a predetermined amount of molten resin 61a is stored in the cylinder 67a, so that the molten resin 61a is extruded and hung down from a slit provided in the T-die 68 through the connecting pipe 77 to form first and second resin sheets 73a, 73b in a molten state.

Molds 71, 72

The resin sheets 73a, 73b are guided between the molds 71, 72. The molds 71, 72 can be divided by a parting surface on which the molds come into contact with each other in a closed state, and the resin sheets 73a, 73b are molded by the molds 71, 72.

Details of Manufacturing Method of Structure 26

Next, with reference to FIG. 25 to FIG. 26, a manufacturing method of the structure will be described. This method includes a molding step in which the structure 26 is formed by closing the first and second molds 71, 72 while the first resin sheet 73a, a core material 25, and the second resin sheet 73b are arranged in this order between the first and second molds 71, 72. The molding step includes a hanging step, a shaping step, a core-material welding step, a mold closing step, and a finishing step.

Hanging Step

Figure 25:
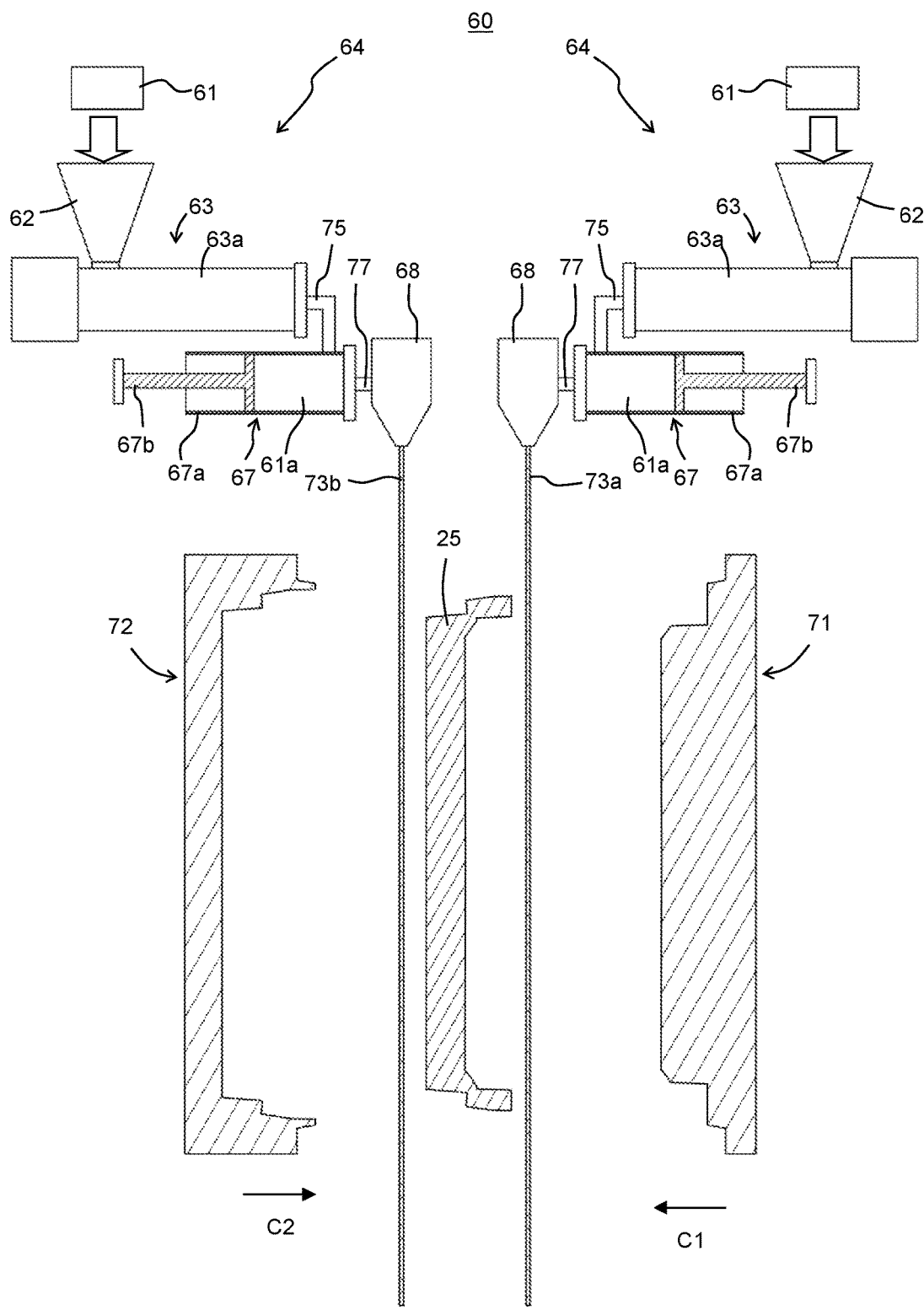
FIG. 25 is a configuration diagram showing the configuration of a molding machine 60 (a core material 25 and molds 71, 72 are shown in a cross-sectional view).

In the hanging step, as shown in FIG. 25, the resin sheets 73a, 73b formed by extruding and hanging down the molten resin 61a from the slit of the T-die 68 are hung between the molds 71, 72. The resin sheets 73a, 73b are hung down between the core material 25 and the molds 71, 72, respectively.

Shaping Step

In the shaping step, the resin sheets 73a, 73b are shaped along an inner surface of the molds 71, 72. The shaping of the resin sheets 73a, 73b may be performed at any time until the completion of the mold closing step.

Core-Material Welding Step

In the core-material welding step, the core material 25 is welded to the resin sheets 73a, 73b. The core material 25 is made of a material that can be welded to the resin sheets 73a, 73b and is, for example, a foamed body. The welding of the core material 25 may be performed at any time until the completion of the mold closing step.

Mold Closing Step

Figure 26:
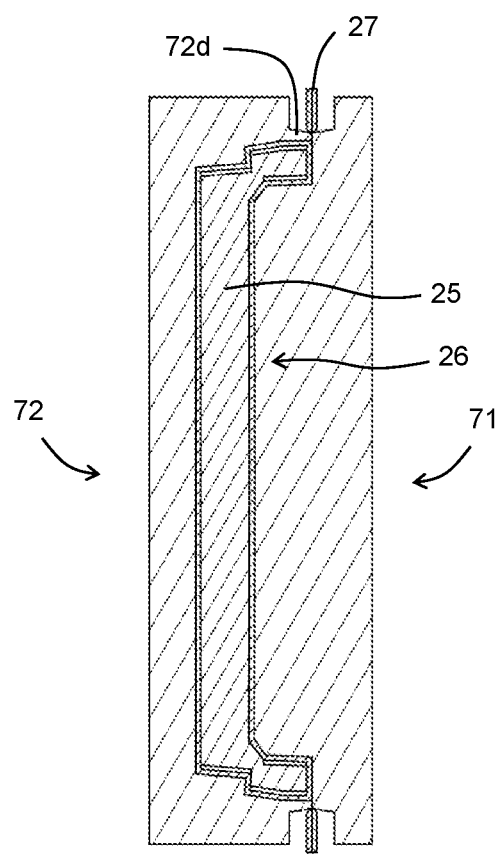
FIG. 26 is a cross-sectional view showing a state after the molds 71, 72 are closed from the state shown in FIG. 25.

In the mold closing step, the molds 71, 72 are moved in a mold closing direction indicated by arrows C1, C2 in FIG. 25 to close the molds 71, 72, as shown in FIG. 26. Consequently, the resin sheets 73a, 73b are welded at a pinch-off portion 72d, and a portion outside the pinch-off portion 72d becomes a burr 27.

Finishing Step

In the finishing step, the structure 26 with the burr 27 is taken out from the molds 71, 72, and the burr 27 is removed to form the structure 26 shown in FIG. 27A.

Details of Configuration of Structure 26

With reference to FIG. 27A to FIG. 27B, details of the configuration of the structure 26 will be described. FIG. 27B shows the structure 26 of a conventional configuration, and FIG. 27A shows the structure 26 of an improved configuration.

The structure 26 shown in FIG. 27A and FIG. 27B includes a base portion 26a and a standing portion 26b standing from an end of the base portion 26a. The structure 26 is configured by accommodating the core material 25 inside a resin molded body 28 configured by molding the resin sheets 73a, 73b.

The resin molded body 28 includes a base wall 28a substantially perpendicular to the mold closing direction (for example, the angle with respect to a plane perpendicular to the mold closing direction is less than 45 degrees) and a standing wall 28b substantially parallel to the mold closing direction of the molds 71, 72 (for example, the angle with respect to the mold closing direction is 45 degrees or less). The resin molded body 28 includes a side wall 28c, which becomes a side surface of the structure 26 at a site provided with the standing portion 26b. Since the direction in which the standing portion 26b stands (in other words, the direction perpendicular to the main surface of the base portion 26a) coincides with the mold closing direction in the present embodiment, the side wall 28c becomes the standing wall 28b.

While a concave portion 26c recessed toward the standing portion 26b is provided at the end of the base portion 26a in the structure 26 shown in FIG. 27A, such a concave portion 26c is not provided in the structure 26 shown in FIG. 27B.

In general, the core material 25 has some dimensional variation. In order to prevent the core material 25 from interfering with the resin sheets 73a, 73b and the molds 71, 72 when the core material 25 is formed larger, the core material 25 is usually formed slightly smaller in the direction perpendicular to the mold closing direction of the molds 71, 72. Consequently, the welding strength between the standing wall 28b and the core material 25 tends to be lower than the welding strength between the base wall 28a and the core material 25. Further, if a gap 26d is formed between the standing wall 28b and the core material 25, or if the standing wall 28b and the core material 25 are in a non-welded state, the welding strength between the standing wall 28b and the core material 25 is zero.

In the structure 26 in which the standing portion 26b is provided and the concave portion 26c is not provided, as shown in FIG. 27B, the gap 26d provided at the end of the base portion 26a extends over a wide area from a lower wall 26a1 of the base portion 26a to an upper wall 26b1 of the standing portion 26b. Consequently, when the resin molded body 28 is cooled and contracts after molding, wrinkles and ripples are likely to occur on the standing wall 28b, which may deteriorate its appearance.

In contrast, the structure 26 shown in FIG. 27A is provided with the concave portion 26c. As a result of forming the concave portion 26c, a bottom wall 28c1 facing the standing portion 26b is formed on the side wall 28c, and the bottom wall 28c1 is welded to the core material 25. In other words, a part of the side wall 28c becomes the base wall 28a due to the concave portion 26c, and the rest remains the standing wall 28b.

The standing wall 28b and the gap 26d are divided by the bottom wall 28c1. Consequently, the area in which the standing wall 28b extends is narrowed, and the occurrence of wrinkles and ripples due to the contraction during cooling is suppressed. The welding strength between the bottom wall 28c1 and the core material 25 is higher than the welding strength between a part of the side wall 28c other than the bottom wall 28c1 (the part that remains the standing wall 28b) and the core material 25.

The core material 25 includes a base portion 25a and a standing portion 25b. The base portion 25a and the standing portion 25b are arranged at a site corresponding to the base portion 26a and the standing portion 26b, respectively. The standing portions 26b, 25b are preferably provided over the entire circumference of the base portions 26a, 25a, respectively. In such a case, the structure 26 and the core material 25 have a shape in which the entire circumference is surrounded by the standing portions 26b, 25b, such as a tray shape. In such a shape, a gap is easily formed between the standing portion 25b and the resin molded body 28, and thus it is particularly significant to apply the present invention.

As shown in FIG. 27A, H1 represents the height from a lower surface 26a2 of the base portion 26a to an upper surface 26b2 of the standing portion 26b, H2 represents the height from the lower surface 26a2 to an upper surface 26a3 of the base portion 26a, and H3 represent the height from the lower surface 26a2 of the base portion 26a to the deepest portion of the concave portion 26c.

H1 is preferably 5 cm or more, and more preferably 8 cm or more. H1 is preferably 30 cm or less. When H1 is 5 cm or more, wrinkles and ripples are particularly likely to occur, and thus it is particularly significant to apply the present invention. Further, when H1 is more than 30 cm, molding may become difficult.

H2/H1 is preferably 0.3 to 0.7, and more preferably 0.4 to 0.6. H2/H1 may be specifically, for example, 0.3, 0.4, 0.5, 0.6, 0.7, and may be within a range between any two of the values exemplified herein. H2 is preferably less than 5 cm. In this case, the balance between moldability and strength becomes particularly excellent.

H3/H1 is preferably 0.1 to 0.9, and preferably 0.2 to 0.8, and more preferably 0.3 to 0.7. H3/H1 may be specifically, for example, 0.1, 0.2, 0.3, 0.4, 0.5, 0.6, 0.7, 0.8, 0.9, and may be within a range between any two of the values exemplified herein. In such a case, the occurrence of wrinkles and ripples are particularly effectively suppressed.

Although the concave portion 26c is formed in a single-step shape in FIG. 27A, the concave portion 26c may be formed in a multi-step shape.

Figure 28:
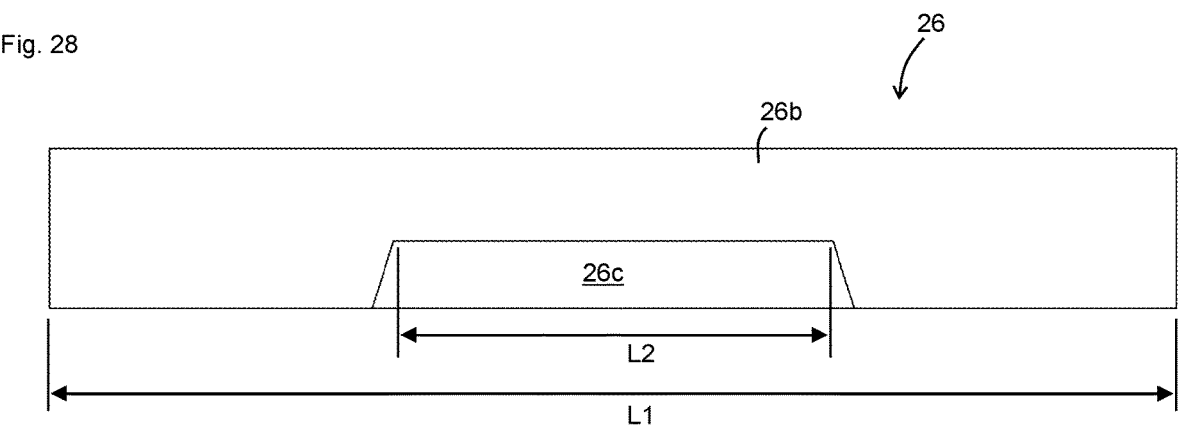
FIG. 28 shows the structure 26 of FIG. 27A from a right side (corresponding to the view of the bottom member 2 of FIG. 1 from a front side).

As shown in FIG. 28, L1 represents the length of the standing portion 26b in the longitudinal direction of the standing portion 26b, and L2 represents the length of the concave portion 26c at its deepest portion. If the base portion 26a is a shape with multiple sides (e.g., a rectangular shape that may be rounded or chamfered), L1 corresponds to the length of the standing portion 26b provided on one side of the base portion 26a.

L1 is preferably 30 cm or more, more preferably 40 cm or more, and more preferably 60 cm or more. Wrinkles and ripples are particularly likely to occur in such a case, and thus it is particularly significant to apply the present invention. L2/L1 is, for example, 0.2 to 0.8, and preferably 0.3 to 0.7. L2/L1 may be specifically, for example, 0.2, 0.3, 0.4, 0.5, 0.6, 0.7, 0.8, and may be within a range between any two of the values exemplified herein. The length of a portion of the standing portion 26b in its longitudinal direction where the concave portion 26c is not provided is preferably 30 cm or less, and more preferably 20 cm or less. In such a case, the occurrence of wrinkles and ripples is particularly effectively suppressed.

The concave portion 26c may be provided at one site or at a plurality of sites. If the base portion 26a has a shape having a longer side and a shorter side (e.g., a rectangular shape that may be rounded or chamfered), it is preferable to provide the concave portion 26c on each longer side of the base portion 26a and is more preferable to provide it on each side. If a plurality of concave portions 26c is provided on each side, L2 described above represents the total length of the concave portions 26c.

The bottom wall 2q and the peripheral wall 2i of the bottom member 2 of the container 1 correspond to the base portion 26a and the standing portion 26b, respectively. As shown in FIG. 1, a concave portion 2r recessed from the end of the bottom wall 2q to the peripheral wall 2i is provided at the center along the longitudinal direction (the left-right direction) and the transverse direction (the front-rear direction) of the bottom member 2. Consequently, wrinkles are less likely to occur on the peripheral wall 2i of the bottom member 2.

REFERENCE SIGNS LIST

1: container,
2: bottom member, 2f: shaft receiving hole, 2g: concave portion, 2i: peripheral wall, 2j: accommodation concave portion, 2h: groove, 2m: engagement hole, 2q: bottom wall, 2r: concave portion,
3: long side wall, 3a: main body, 3a1: inner surface, 3b: engagement metal fitting, 3b1: engagement convex portion, 3c: engagement convex portion, 3c1: inclined surface, 3c2: inclined surface, 3d: accommodation concave portion, 3e: shaft receiving hole, 3g: curved surface, 3g1: engagement concave portion, 3g2: engagement concave portion, 3j: accommodation concave portion, 3k: shaft receiving hole, 4: short side wall, 4a: main body, 4a1: side surface, 4b: ridge, 4c: protruding shaft, 4d: accommodation concave portion, 4e: base surface, 5: first upper wall, 5a: tip surface, 5b: inclined surface, 5f: accommodation concave portion, 5g: tip surface, 5h: overlapping portion, 5i: adjacent portion, 5j: shaft receiving hole, 5k: ridge, 5l: convex portion, 51l: ridge, 5m: inclined surface, 6: second upper wall, 6a: tip surface, 6b: inclined surface, 6c: groove, 6g: tip surface, 6h: overlapping portion, 6i: adjacent portion, 6l: convex portion, 61l: ridge, 6m: inclined surface, 7: lower hinge member, 7a: case, 7b: side-wall locking portion, 7c: bottom-member locking portion, 7d: ridge, 8: upper hinge member, 8a: case, 8b: upper-wall locking portion, 8c: side-wall locking portion, 9: connecting mechanism, 11: latch structure, 11a: metal fitting body, 11a2: engagement concave portion, 11c: protruding member, 11c1: tip portion, 11c2: tip surface, 12: locking member, 12a: fixed portion, 12b: hinge portion, 12c: engagement portion, 12c1: opening, 12c2: inclined portion, 12c3: flat portion, 12c4: boundary line, 12c5: upper end, 12d: groove, 12e: connecting portion, 12f: base member, 25: core material, 25a: base portion, 25b: standing portion 26: structure, 26a: base portion, 26a1: lower wall, 26a2: lower surface, 26a3: upper surface, 26b: standing portion, 26b1: upper wall, 26b2: upper surface, 26c: concave portion, 26d: gap, 27: burr, 28: resin molded body, 28a: base wall, 28b: standing wall, 28c: side wall, 28c1: bottom wall, 60: molding machine, 61: raw material resin, 61a: molten resin, 62: hopper, 63: extruder, 63a: cylinder, 64: sheet forming device, 67: accumulator, 67a: cylinder, 67b: piston, 68: T-die, 71: mold, 72: mold, 72d: pinch-off portion, 73a: first resin sheet, 73b: second resin sheet, 75: connecting pipe, 77: connecting pipe

The invention claimed is:

1. A container, comprising:
a first side wall and a second side wall facing each other;
a third side wall provided therebetween;
a first upper wall and a second upper wall; and
a locking member,
wherein the first side wall and the second side wall face each other,
the first upper wall and the second upper wall are configured to be rotatable with respect to the first side wall and the second side wall, respectively, and each comprise a convex portion protruding toward the locking member,
the convex portions are provided with ridges, respectively, at a portion corresponding to a parting line for manufacturing the first upper wall and the second upper wall, wherein the ridges are provided to increase a thickness of the convex portions,
the locking member comprises a fixed portion and an engagement portion, the fixed portion being fixed to the third side wall, the engagement portion being engaged with at least one of the first upper wall and the second upper wall to prevent the first upper wall and the second upper wall from opening, and
an inclined portion inclined away from the first upper wall and the second upper wall is provided at an upper end of the engagement portion in an engaged state, when starting from the first upper wall and the second upper wall.

2. The container of claim 1,
wherein
the engagement portion comprises an opening, and
the engagement portion is engaged with the first upper wall and the second upper wall by inserting the convex portion of the first upper wall and the second upper wall into the opening, to prevent the first upper wall and the second upper wall from opening.

3. The container of claim 1,
wherein the first upper wall and the second upper wall comprise an overlapping portion overlapping each other,
the first upper wall is arranged above the second upper wall in the overlapping portion,
the first upper wall comprises a convex portion protruding toward the locking member,
the engagement portion comprises an opening, and
the engagement portion is engaged with the first upper wall by inserting the convex portion of the first upper wall into the opening, to prevent the first upper wall and the second upper wall from opening.

4. The container of claim 1,
wherein the locking member comprises a hinge portion, and
the engagement portion is bendable at the hinge portion with respect to the fixed portion.

5. The container of claim 4,
wherein the hinge portion is made of elastomer.

6. The container of claim 5,
wherein the locking member comprises a connecting portion configured to connect the fixed portion and the engagement portion, and
the hinge portion is formed to cover the connecting portion with the elastomer.

* * * * *